(12) United States Patent
Lee

(10) Patent No.: US 6,717,890 B2
(45) Date of Patent: Apr. 6, 2004

(54) INFORMATION PROCESSING APPARATUS HAVING A MULTITASKING FUNCTION WITH ONE OR MORE OPTICAL DISCS

(75) Inventor: Howard Hong-Dough Lee, Bloomfield, MI (US)

(73) Assignee: Intellectual Science and Technology Inc., Bloomfield, MI (US)

( * ) Notice: Subject to any disclaimer, the term of this patent is extended or adjusted under 35 U.S.C. 154(b) by 0 days.

(21) Appl. No.: 10/422,041

(22) Filed: Apr. 25, 2003

(65) Prior Publication Data

US 2003/0193848 A1 Oct. 16, 2003

Related U.S. Application Data

(60) Continuation of application No. 09/111,824, filed on Apr. 15, 1998, which is a division of application No. 08/613,806, filed on Mar. 5, 1996, now Pat. No. 5,748,575.

(51) Int. Cl.[7] .............................................. G11B 17/22
(52) U.S. Cl. ................................ 369/30.03; 369/30.88; 369/30.93; 369/31.01
(58) Field of Search ........................... 369/30.33, 30.88, 369/31.01, 13.28, 13.55, 13.29, 30.93, 30.03, 30.38, 219, 126, 44.15, 30.89; 709/100; 711/118, 113, 133, 159, 112; 360/70, 72.1

(56) References Cited

U.S. PATENT DOCUMENTS

| | | |
|---|---|---|
| 3,774,172 A | 11/1973 | Silverman |
| 4,387,452 A | 6/1983 | Bricot et al. |
| 4,644,545 A | 2/1987 | Gershenson |
| 4,722,078 A | 1/1988 | Nakanishi et al. |
| 4,888,751 A | 12/1989 | Yoshimaru et al. |
| 5,043,963 A | 8/1991 | Iwamoto |
| 5,119,354 A | 6/1992 | Umesaki |
| 5,146,451 A | 9/1992 | Kang |
| 5,189,652 A | 2/1993 | Inoue |
| 5,193,079 A | 3/1993 | Ko et al. |
| 5,251,192 A | 10/1993 | Liu |
| 5,253,235 A | 10/1993 | Isobe et al. |
| 5,311,494 A | 5/1994 | Sugita et al. |
| 5,327,417 A | 7/1994 | Tanaka et al. |
| 5,335,218 A | 8/1994 | Osada |
| 5,375,113 A | 12/1994 | Pollard et al. |
| 5,495,457 A | 2/1996 | Takagi |
| 5,574,881 A | 11/1996 | Yasuoka et al. |
| 5,615,345 A | 3/1997 | Wanger |
| 5,631,893 A | 5/1997 | Kang et al. |
| 5,638,391 A | 6/1997 | Shima et al. |
| 5,659,438 A * | 8/1997 | Sasamoto et al. ........ 360/78.09 |
| 5,666,334 A | 9/1997 | Tokuyama et al. |
| 5,734,631 A | 3/1998 | Ikedo et al. |
| 5,764,441 A * | 6/1998 | Aruga et al. ................ 360/265 |
| 5,790,483 A | 8/1998 | Kawai |

FOREIGN PATENT DOCUMENTS

| | | |
|---|---|---|
| JP | 359036338 A | 2/1984 |
| JP | 404310682 A | 11/1992 |

* cited by examiner

*Primary Examiner*—Ali Neyzari

(57) ABSTRACT

A multitasking information processing method comprises the steps of (a) providing a plurality of turntables each for detachably storing an optical disc thereon; (b) affording a plurality of optical units each comprising a driving means and an optical read head; (c) simultaneously controlling the driving means so as to move the optical read heads in radial directions of the optical disc to a plurality of predetermined disc positions for simultaneously retrieving information stored thereon; (d) multitaskingly or simultaneously processing a plurality of information sets retrieved; and (e) rendering data transmitting means capable of multitaskingly transmitting the processed information sets processed.

16 Claims, 15 Drawing Sheets

INFORMATION PROCESSING APPARATUS HAVING A MULTITASKING FUNCTION WITH ONE OR MORE OPTICAL DISCS

This is a continuation of allowed U.S. Ser. No. 09/111,824 filed on Apr. 15, 1998, which in turn is a division of U.S. Ser. No. 08/613,806 filed on Mar. 5, 1996, now U.S. Pat. No. 5,748,575.

FIELD OF THE INVENTION

The present invention relates generally to the field of information processing utilizing optical discs and particularly to a high-efficient optical-disc-type apparatus allows a host computer to effectively and/or multitaskingly perform various information processing actions directly from optical discs so as to alleviate the heavy burden of a hard-disk drive in the process of information reproducing.

BACKGROUND OF THE INVENTION

An optical disc or compact disc (CD) is made from a transparent plastic material with a thickness of about 1.2 mm that contains a protected thin metal film wherein pits (or depressions) are formed. The pits have light reflectivities different from the light reflectivity of nonpitted portions of the metal film, thus forming a series of 0s and 1s for digital storage of data. In production, a master disc is first developed from a glass disc coated with a uniform layer of photoresist material that is subjected to a series of exposures to a high-power energy beam or laser for forming various pits via the technology of photolithography. The master disc is then used to develop a nickel mother for use in stamping out multiple copies of the discs in transparent plastic material. Each of these is then coated with a thin metallic reflecting layer and then with a protective polymer coating on top of that. When reproducing the stored information, a low-power laser is used to sense the presence or absence of pits. Because a laser beam can be so focused, adjacent tracks of the spiral of pits need be no larger than 1.6 $\mu$m. As a result, one side of a typical 120-mm (4.72-in) CD can have 20,000 tracks for holding a minimum of 500 megabytes of data which can easily store the text of a 20-volume encyclopedia, while both surfaces of a typical 133-mm (5.25-in) or a 89-mm (3.5-in) floppy disk are able to respectively hold only 1.2 or 1.44 megabytes.

Owing to the nature of their high storage capacity, optical discs are especially suitable for storing information requiring or taking large storage spaces, such as patent information, video data, and digital audio files. In addition to the floppy-disk version, software developers have recently produced the 120-mm read-only-memory CD (CD-ROM) version of executable software programs, such as IBM® OS/2 and Microsoft Windows® 95 for use in personal information processing apparatuses, such as desktop- or notebook-type computers.

Even though becoming increasingly popularly equipped in computers, a CD-ROM drive plays a much less significant role in information processing when compared with a hard-disk drive that utilizes the magnetic recording technology. This is because the currently available computers are designed to execute a program or software basically through reproducing the information stored on hard-disk drives, especially when the size of a program exceeds the storage capacity of a floppy disk. When sold to an end user, a software program for use in applications such as disk controlling, word processing, spread sheet, drawing, and presentation making, is compressedly stored on a plurality of floppy disks or an optical disc. Regardless of being either stored in floppy disks or an optical disc, a purchased software program needs to go through a tedious software installation process through which all program files are decompressedly copied to a hard-disk drive wherefrom the software program is then executed. In accordance with this conventional practice, the storage space of a hard-disk drive is quickly filled up. This not only incurs indirect cost in the expenditure of the hard-disk drive in addition to the purchased price of a software program to the end user, but eventually slows down the read-and-write operation efficiency of the hard-disk drive because any data files created are constantly rewritten, fragmentally relocated, and eventually scattered all over the hard-disk drive. Accordingly, a longer time is needed to find all of the data of a particular file. The only remedy currently available for this problem is to routinely run a hard-disk maintenance process in order to remove file fragmentation. Unfortunately, as more software programs or data files are stored on the hard-disk drive, the hard-disk maintenance process becomes more and more time-consuming, because it also involves relocation of the program files that occupy most of the space of the hard-disk drive but are never changed or altered throughout the entire life of their usage. Still there is another concern that a hard-disk drive is subject to nonphysical damages, for instance, such as program files being truncated or cross-linked due to improper assessing or writing during information reproducing or being infected by computer virus. As a result, a software program becomes corrupted; and, another tedious software installation process is again needed. All of these point to the fact that the currently available computers are designed to preform information processing by reproducing the information stored on hard-disk drives; and, this is not necessarily desirable.

Since a software program is mostly stored on a plurality of floppy disks for its distribution, an end user is routinely advised to make a set of backup copies because floppy disks are susceptible to physical and external damages. Inevitably, another disadvantage is incurred: a time-consuming process for making backup copies.

The need to install a purchased software to a hard-disk drive further incurs another problem: it is extremely difficult for software developers to stop or prevent illegal-copying of software. There are existing hardware-type protection devices and password-type protection approaches; but they are affordable only for high-price software programs with an aim of selling at most a few thousand copies for use in trading stocks or futures in real time, for instance. In contrast, volume software programs are sold in sealed envelopes. Once a sealed envelope is opened, an end user is assumed to accept the software license agreement set by a software developer; and, the software program is not returnable. Unfortunately, there is no practical way to prevent an end user from illegally coping such a software program. As the software developers producing high-volume and low-price software programs suffer from their products being illegally copied, the consumers lose their opportunity to try out a software program before purchasing.

In view of the disadvantages and problems mentioned hereinbefore, it is clear that currently available computers and optical disc or floppy-disk apparatuses are not designed to achieve their optimal potential. Owing to the nature of durability and storage capacity far superior to that of a floppy disk, an optical disc has a greater potential to become a memory storage medium for constructing a special type of apparatus to remedy the disadvantages currently encountered in the available information processing apparatuses.

Thus, the main interest of the present invention is to design a high-efficient optical disc apparatus wherefrom software programs can be directly launched so as to eliminate tedious, time-consuming software installation and thus to offer an alternative of copy-right protection to software developers, as well as to alleviate the heavy burden of a hard-disk drive in information processing. Also essential for an information processing apparatus of this type is the feature of disc-loading and -unloading flexibility that allows a user to easily change or replace desired discs at will. In order to achieve the highest efficiency in information reproduction, any discs and thus disc positions should be readily accessible by at least one optical unit at any time. An optical read head should be able to travel from one disc to another, and its travelling should be limited to one-directional movement (either linear or circular) because multiple-directional or three-dimensional movement greatly slows down optical-read-head travelling efficiency. It is also highly desirable that an information processing apparatus of this type in accordance with the present invention comprises multiple disc sites each able to detachably hold a disc so that various software programs are readily available because Microsoft®, WordPerfect®, or Lotus® are most likely to produce their own software discs.

Multitasking or multiprocessing is another highly desirable feature for an information processing apparatus of this type in accordance with the present invention. In the context of the present invention, multitasking or multiprocessing is defined as referring to separate hardware control units that allow execution of separate or several software programs simultaneously. Because of containing a plurality of discs wherefrom several programs can be directly launched, an information processing apparatus of this type needs a safeguard device to prevent the discs stored therein from being unauthorizedly removed. Further, this type of information processing apparatus should be compact enough to be internally installed in a computer, because with the trend towards miniaturization, no future computers would be spacious enough for internally storing a bulky CD apparatus holding more than two horizontally spaced 120-mm discs.

An information processing apparatus of this type with all or a selected combination of the features mentioned hereinbefore is not yet readily taught by the prior arts. This is discussed as follows.

U.S. Pat. No. 4,644,515 describes a laser-disc digital data video storage system in which multiple discs stacked upon a common rotatable drive shaft are to be read by a plurality of stationary read head arrays for commercial use. This jukebox-like system allows multiple users to access its information by employing a huge number of read heads, for example 55,000 heads (or one head for each track), in each read head array. One of the main disadvantages of this type of system is its lacking disc-loading and -unloading flexibility; that is a user cannot access the common drive shaft for changing or replacing a desired disc at will. U.S. Pat. No. 4,888,751 describes an image information processing system in which (at least) an optical unit having an optical head arm rotatable through 180 degrees is used to scan the information stored on either adjacent side of multiple discs that are stacked at predetermined intervals on a detachable mounting mechanism. The detachable mounting mechanism provides some improvement in disc-loading and disc-unloading flexibility over U.S. Pat. No. 4,644,515 mentioned above, but is still inconvenient for a user to replace or change a desired disc at will due to the stacking nature of its disc arrangement. This prior apparatus is afforded with a plurality of optical units such that one of the optical units is most likely readily available for vertically moving to a next selected disc. In such a manner, the process of accessing information recorded on a different disc is speeded up; otherwise, the access time will be unacceptably slow since an optical unit in such a system has first to retract out of a disc space by swinging, to move vertically to a new disc space to be entered, and then to seek a new track by swinging. In this prior art, it is obvious that the presence of the multiple optical units is intended for speeding up disc-track access time between discs, but not for achieving any multitasking.

To improve the access time for reproducing the information stored on different discs, U.S. Pat. No. 5,189,652 describes a stationary-type optical disc apparatus that is characterized by a plurality of optical units each slidable into a disc space to access a predetermined position of a disc. Although it reduces the access time, this system neither affords disc-loading and -unloading flexibility referred to above because of its stationary and disc-stacking natures, nor provides any multitasking capability.

Instead of using the approach of stacking as used in the abovementioned prior arts, U.S. Pat. No. 4,722,078 employs a plurality of horizontally spaced disc compartments (or trays) each holding an audio disc which, upon selection, can be scanned by a disc playback module that is capable of being horizontally transported between the disc compartments. Because each disc compartment has a separate means for independently extending and retracting out of and into the apparatus, this audio CD player requires multiple front entrances. In other words, this configuration is too bulky and cannot be internally installed into the existing drive bays of current computers, which typically have dimensions of 146-mm (5.75-in) in width, 41-mm (1.75-in) in height, and up to about 254-mm (10-in) in depth. In addition, it lacks multitasking capability.

Other examples using the nonstacking approach are embodied in U.S. Pat. Nos. 5,146,451, 5,193,079, and 5,251,192. However, in accordance with these prior arts, discs are not readily accessible at any time because their disc-storage sites need to move to a predetermined position before a selected disc becomes accessible, thus slowing down information-reproduction efficiency. Similar inefficiency is also seen in U.S. Pat. Nos. 5,119,354 and 5,335,218 that utilize a disc transfer means comprising a drive roller to deliver a disc selected from a disc container or magazine (having a plurality of discs in a pile therein) to a disc drive for rotating and thus reading. Although improving disc-loading and -unloading flexibility referred to above, all of these prior apparatuses with capability of holding a plurality of discs require several additional transitional stages before a selected disc becomes accessible to a singular optical unit. These apparatuses are best for use in as-intended audio applications, not for use in information processing that requires high-efficient, high-speed information reproduction.

Providing disc-loading and -unloading flexibility to some extent; U.S. Pat. No. 5,043,963 provides an information processing apparatus capable of playing a disc selected from a plurality of sizes such as 80-, 120-, 200- or 300-mm in diameter. These multisized discs are laid on a tray wherein a circular-like section used to store a plurality of small-sized discs is rotatable for their selection. Different versions of apparatuses capable of playing optical discs with different diameters are seen in U.S. Pat. Nos. 5,119,354 and 5,253,235. The ability of playing the discs with different diameters is desirable, however, the discs in these prior apparatuses fail to be readily accessible by their single optical unit at any time.

In the conventional CD apparatuses, a single clamp device (or press member) capable of pivoting downwardly or upwardly is often used to pinch a disc mounted to a drive shaft or turntable for rotating. Clamp devices of this type are embodied in U.S. Pat. Nos. 4,722,078, 5,146,451, 5,251,192, and 5,253,235. Those are not suitable for use when a plurality of discs need to be in a readily-accessible state at any time. U.S. Pat. No. 5,375,113 describes a simple clamping mechanism for each of a number of turntables, which is desirable. However, it remains to be seen whether the clamping mechanism can provide necessary clamping force and at the same time can afford an easy release of a loaded disc. Accordingly, there is a need to design a simple, yet effective and space-saving disc-clamping device with disc-loading and -unloading flexibility for use in the information processing apparatus in accordance with the interest of the present invention.

In order to simultaneously launch several software programs directly from either an optical disc or multiple optical discs in accordance with the interest of the present invention, the hardware of an information processing apparatus must possess multitasking capability. This requires not only having a plurality of optical units but also a variety of signal process means (such as decoders), control means (including a plurality of microprocessors or a microprocessor with multitasking capability) and data transmitting means that all coordinately work together for reproducing plural sets of data simultaneously from various disc positions on a disc or on several discs and at the same time transmitting them to a host computer. Otherwise, optical units cannot be instructed to independently and simultaneously move to a plurality of predetermined disc positions plural sets of data retrieved from discs cannot can be simultaneously processed for returning back to their original state and then transmitted to a host computer. Thus, plural discs and optical units will make an information processing apparatus more efficient in terms access time, but will not necessarily arrive at any multitasking nature needed for future high-speed information processing. One example is exemplified in U.S. Pat. No. 5,375,113 which describes an apparatus that has a plurality of disc storage sites (in nonstacking form), each having a separate drive means and an optical disc situated together, for reading data specifically from one single, selected optical disc. The main object of the prior art is to eliminate much of the costly and duplicative hardware found in systems utilizing drive cartridges so that common control means such as latches, demultiplexers, and multiplexers are used in order to fulfill its main object for delivering a power signal to a selected single disc storage site for activating its drive means to read information from its respective disc. Even though various electronic configurations are given, the prior art utilizes only one single microprocessor for instructing which drive means should be turned on or which servo control device should be activated. Under the circumstances, it is not possible to simultaneously issue multiple commands or control signals to activate and thus to control a plurality of drive means for performing information reproduction from plural discs at the same time. In essence, the prior apparatus is specifically designed for information reproduction to take place one at a time in a selected disc storage site; thus, it lacks a multitasking capability. This is further substantiated in the fact that throughout the entire context, this prior art neither mentions nor even suggests retrieving information simultaneously from plural discs and sending plural sets of retrieved information at the same time to its host computer, which are all essential for multitasking to take place.

It is clear that each of the current CD apparatuses has its own merit but all suffer from various types of disadvantages, such as being unable to launch programs directly from optical discs, lack of multitasking capability, the inability for all discs and thus disc positions to be readily accessible with respect to at least one optical unit at any time, lack of disc-loading and -unloading flexibility, lack of flexibility for optical units to travel between discs, lack of an efficient means for an optical read head to selectively travel between discs, too bulky to be installed in a host computer, and/or lack of a device to safeguard optical discs from being unauthorizedly removed.

SUMMARY OF THE INVENTION

A primary object of the present invention is to provide an information processing apparatus with multitasking-capability hardware so that a plurality of optical units are capable of independently and simultaneously moving to a plurality of disc positions, making it possible to launch one or several software programs directly from the information processing apparatus, to provide true multitasking capability, to eliminate tedious and time-consuming software installation, to offer a kind of copy-right protection, and to alleviate the burden of a hard-disk drive in information reproduction processing.

Another object of the present invention is to provide an information processing apparatus with turntables having disc-loading and -unloading flexibility, wherein each turntable comprises a disc-holding and -releasing means with self-clamping and self-releasing feature for each optical disc.

Another object of the present invention is to provide an information processing apparatus with turntables and optical units being arranged in a particular manner, wherein each optical unit comprises an efficient driving means for moving at least one optical read head selectively between discs so that several optical read heads are able to independently move to a plurality of predetermined disc positions on the same disc surface of a selected optical disc for simultaneously retrieving a plurality of information stored thereon.

Another object of the present invention is to provide an information processing apparatus with turntables and optical units being arranged in a particular manner so that the same driving mechanism is used to move the optical read head of each of said optical units selectively between disc positions and between discs, for greatly improving information access efficiency when an optical unit needs to move between discs.

Another object of the present invention is to provide an information processing apparatus with a variety of control means (including a plurality of microprocessors or a microprocessor with multitasking capability) so that at least two optical units are able to work coordinately and simultaneously on separate portions of a software program, for greatly improving efficiency in information reproduction.

Another object of the present invention is to afford an information processing apparatus with a security means to safeguard the optical discs stored therein from being unauthorizedly removed.

Another object of the present invention is to provide an information processing apparatus with a plurality of disc compartments so that it is possible to replace an optical disc in one disc compartment while the other optical discs stored in another disc compartment remain operating.

Another object of the present invention is to provide an information processing apparatus with a control means to allow a disc to be scanned either at a constant angular velocity (CAV) method or at a constant linear velocity (CLV) method.

Another object of the present invention is to provide an information processing apparatus with at least one turntable that can accommodate an optical disc with different disc diameters, affording greater application flexibility.

The present invention improves the conventional information reproduction practice by providing an optical information processing apparatus with multitasking-capability hardware and disc-loading and -unloading flexibility means, thereby allowing a user to launch a software program or simultaneously a plurality of software programs directly from an optical disc or several optical discs stored therein. The multitasking-capability hardware of the present invention comprises a plurality of turntables, optical units, control means, signal-process means, and data transmitting means to coordinately work together for multitaskingly retrieving, controlling and transmitting a plurality of information simultaneously from various positions of a disc or several discs to a host computer. Turntables and optical units are arranged and rendered in a particular manner such that at least one optical unit can access any positions of at least two discs, a plurality of optical read heads situated in said optical units can independently and simultaneously access a plurality of positions of on the same surface of a disc for high-speed information processing; and/or a plurality of positions of separate disc surfaces for multitaskingly perform several programs at the same time. In accordance with the present invention, the number of optical units can be less as compared with that of turntables, for reducing the production costs of making an optical information processing apparatus while maintaining high efficiency in information reproduction.

An optical information processing apparatus of this type is optionally equipped with a plurality of disc compartments so that one disc compartment can be independently open for disc exchanging while the other disc compartment remains closed and active programs remain operating, with a disc holding means having self-clamping and self-releasing feature to facilitate disc-loading and -unloading operation, with at least one turntable capable of accommodating a disc with various disc diameters, with a control means to allow a disc to be scanned either at a constant angular velocity (CLV) method or at a constant linear velocity (CLV) method, and/or a safeguard mechanism.

DETAILED DESCRIPTION OF THE PREFERRED EMBODIMENT

Figure 1:
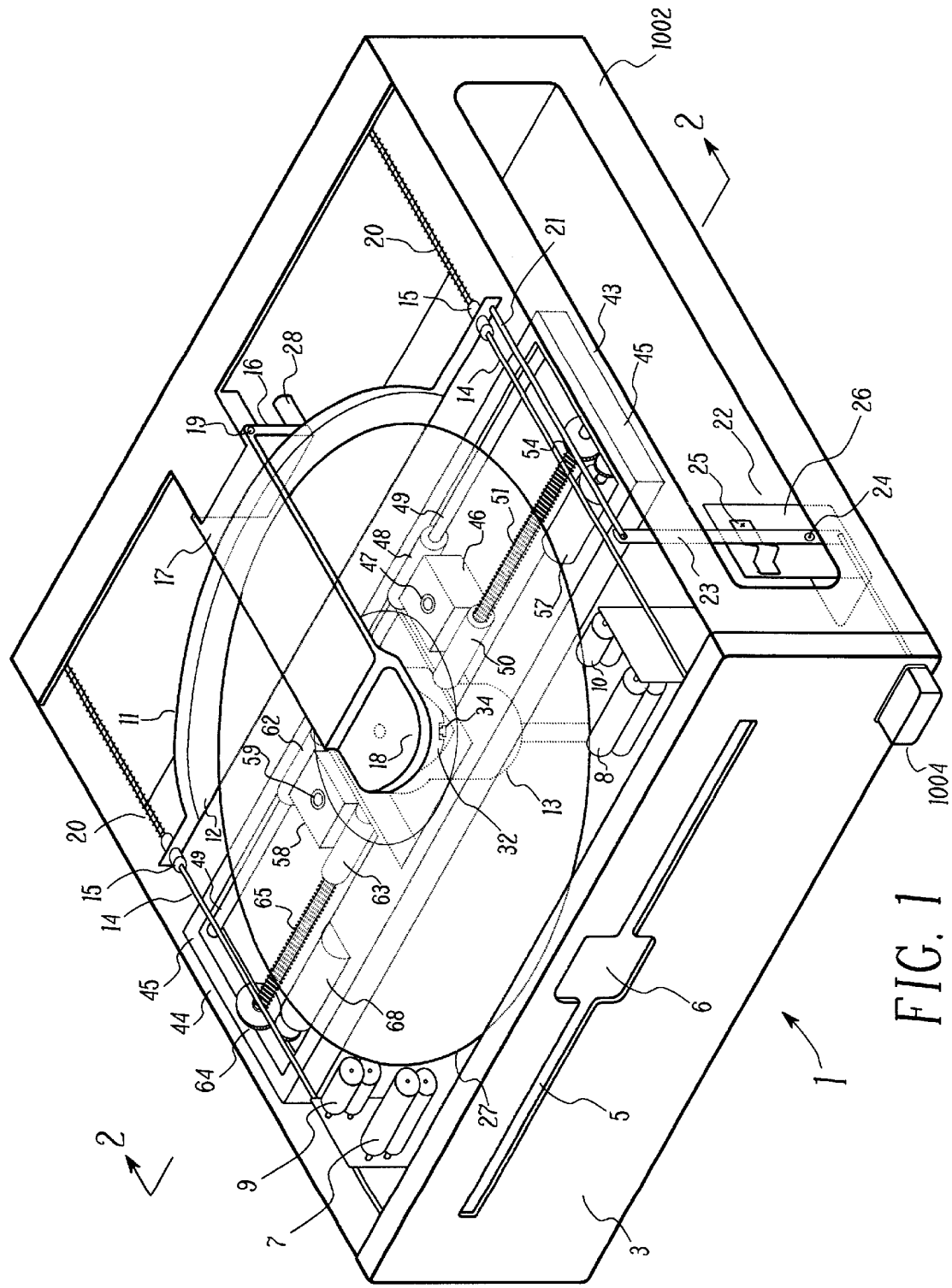
FIG. 1 is a perspective view of a multitasking information processing apparatus in accordance with the present invention having two optical units capable of being used to reproduce information simultaneously from two different positions of an optical disc.
Figure 2:
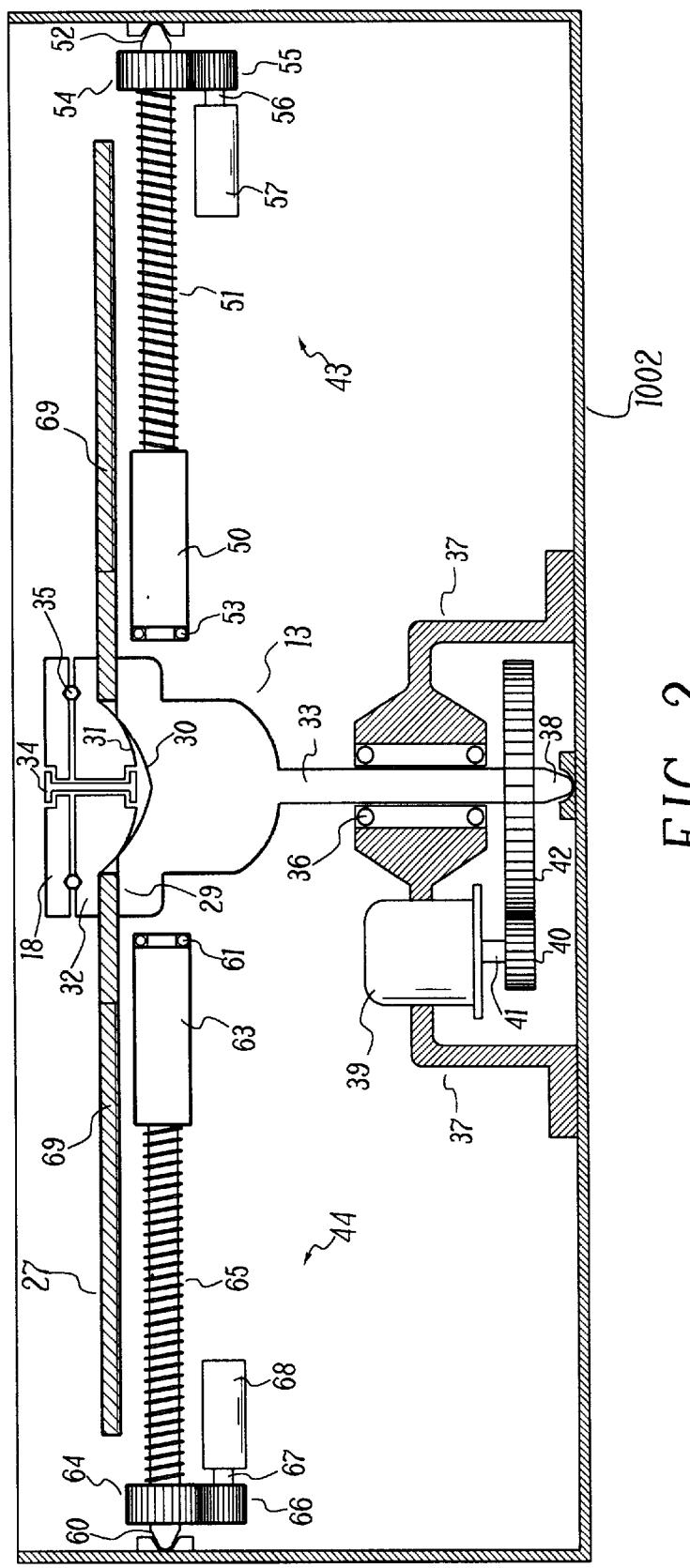
FIG. 2 is a cutaway side view taken along the line 2—2 of FIG. 1, schematically showing an arrangement of the multitasking information processing apparatus.

Referring now to FIGS. 1 and 2, one embodiment of the present invention will be described in detail hereinbelow.

FIG. 1 is a perspective view of an information processing apparatus 1 with multitasking capability in accordance with the present invention, having two optical units 43 and 44 and one optical disc 27 in a loaded condition. Apparatus 1 has a structural frame 1002 on which various mechanism components are mounted. The frame also serves for the apparatus 1 to be either internally installed as a built-in unit in a computer or covered by a housing for use as a stand-alone unit to be connected to a computer. Provided with apparatus 1 is a front panel 3 having a disc-releasing button 1004 and a disc supplying slot 5 on which there exists a larger opening 6. Disc supplying slot 5 is in a size just allowing an optical disc to be inserted into or extracted out of the apparatus. Larger opening 6 is provided to allow a user's finger to push a disc, being inserted through first guide roller pairs 7 and 8 and then second guide roller pairs 9 and 10 further toward the inside of the apparatus 1 by moving a disc levelling mechanism 11 backward. Disc levelling mechanism 11 has a flat area 12 that is in a horizontal position slightly lower than the disc-setting table 29 (seen in FIG. 2) of a turntable (or spindle) 13 so that a disc is prevented from being tipped over and thus is disposed on disc-setting table 29 during loading. Disc levelling mechanism 11 is slideable along a pair of horizontally disposed guide rails 14 through a pair of bearings 15. When pushed backward to a predetermined position, disc levelling mechanism 11 moves the rear-end portion 16 of a disc clamp arm 17 backward so that a disc clamp head 18 at the distal end of clamp arm 17 is pivoted downward about a fulcrum 19 by compressing springs 20 mounted on the rear portion of guide rails 14 so that a rod 21 connecting disc levelling mechanism 11 to a mechanical holding mechanism 22 is pulled backward. When pulled to a predetermined position, the top portion of a position holder 23 in mechanical holding mechanism 22 is pivoted backward about a fulcrum 24 so as to move the middle portion of position holder 23 over a spring strip 25. The spring strip is arranged to have one end fixed to a support plate 26 and the other end being free, thus allowing the move-over action of position holder 23 to take place whenever there is an external force sufficient to overcome the holding force of spring strip 25. Position holder 23 is held by spring strip 25 against the force of compressed springs 20 and disc levelling mechanism 11 is thus not touching the edge of a disc 27.

During disc loading, disc levelling mechanism 11 is moved backward to a predetermined position so that a microswitch (not shown) activates a solenoid 28 to pivot disc clamp head 18 downward further so as to tightly grip optical disc 27 onto turntable 13 for subsequent rotation. As detailed in FIG. 2, that is a partial cutaway side view taken along the line 2—2 of FIG. 1, on the top of turntable 13 are a disc-setting table 29 for bearing disc 27 horizontally and a concave portion 30 for accommodating a convex portion 31 of disc clamp 32. Together with concave portion 30, convex portion 31 horizontally moves disc 27 to a correct position for gripping and thus for rotation about turntable shaft 33. The top of convex portion 32 is rotatably connected to disc clamp head 18 by a connecting member 34 and is provided with bearings 35 for its rotation. While the top portion of turntable 13 is rotatably stabilized by disc clamp head 18 of clamp arm 17, the middle portion of turntable shaft 33 is rotatably held by bearings 36 mounted on support frame 37 and the bottom end is supported by a pivot 38. Support frame 37 also holds a turntable motor 39. Turntable shaft 33 is rotated by turntable motor 39 through a power transmission system, including a gear 40 mounted on a motor shaft 41 and a gear 42 mounted on the near-bottom end of turntable shaft 33.

Apparatus 1 has two optical units 43 and 44 horizontally supported by a common frame 45 that is held by the top portions of the side panels of structural frame 1002. Optical unit 43 has an optical read head 46 with a lens system 47 for reading the information stored on the lower surface of disc 27. Read head 46 is supported by a bearing-type carrier member 48 which is slideable along a sliding rail 49, and a carrier member 50 having a hole with a female screw which is engaged with a screw shaft 51. Screw shaft 51 is rotatably supported by bearings 52 and 53 mounted on common frame 45 and has a gear 54 engaged with a gear 55 on motor shaft 56 of motor 57, thus forming a driving mechanism for optical read head 46. Similarly disposed horizontally on the other end of the same common frame 45 is optical unit 44 that comprises an optical read head 58 with a lens system 59, support bearings 60 and 61, a bearing-type carrier member 62, a carrier member 63 with female screw, a gear 64 on a screw shaft 65, a gear 66 on a motor shaft 67 of a motor 68, thus forming a driving mechanism for optical read head 58. Optical read heads 46 and 58 are to the best extent arranged to have travelling paths falling onto the same imaginary travelling plane (not shown) parallel to the disc surface. Upon receiving power signals from microprocessors (not shown), motors 57 and 68 independently and simultaneously move optical read heads 46 and 58 to predetermined positions in a radial direction of disc 27 for simultaneously reproducing information from two separate positions of information-stored area 69 on the same surface of disc 27.

In order to perform the abovementioned multitasking, motor 39 and thus disc 27 are rotated at a constant angular velocity (CLV). Even though being reduced to half, the storage capacity of a compact disc employing the CLV method remains enormous, for instance, an 120-mm optical disc can still hold a minimum of 250 megabytes of data. Most importantly, the CLV rotation method allows the apparatus of the present invention to rotate at a constant, higher angular velocity for multitaskingly performing high-speed information reproduction.

Referring now to FIGS. 3–7, another embodiment of the present invention will be described in detail hereinbelow.

Figure 3:
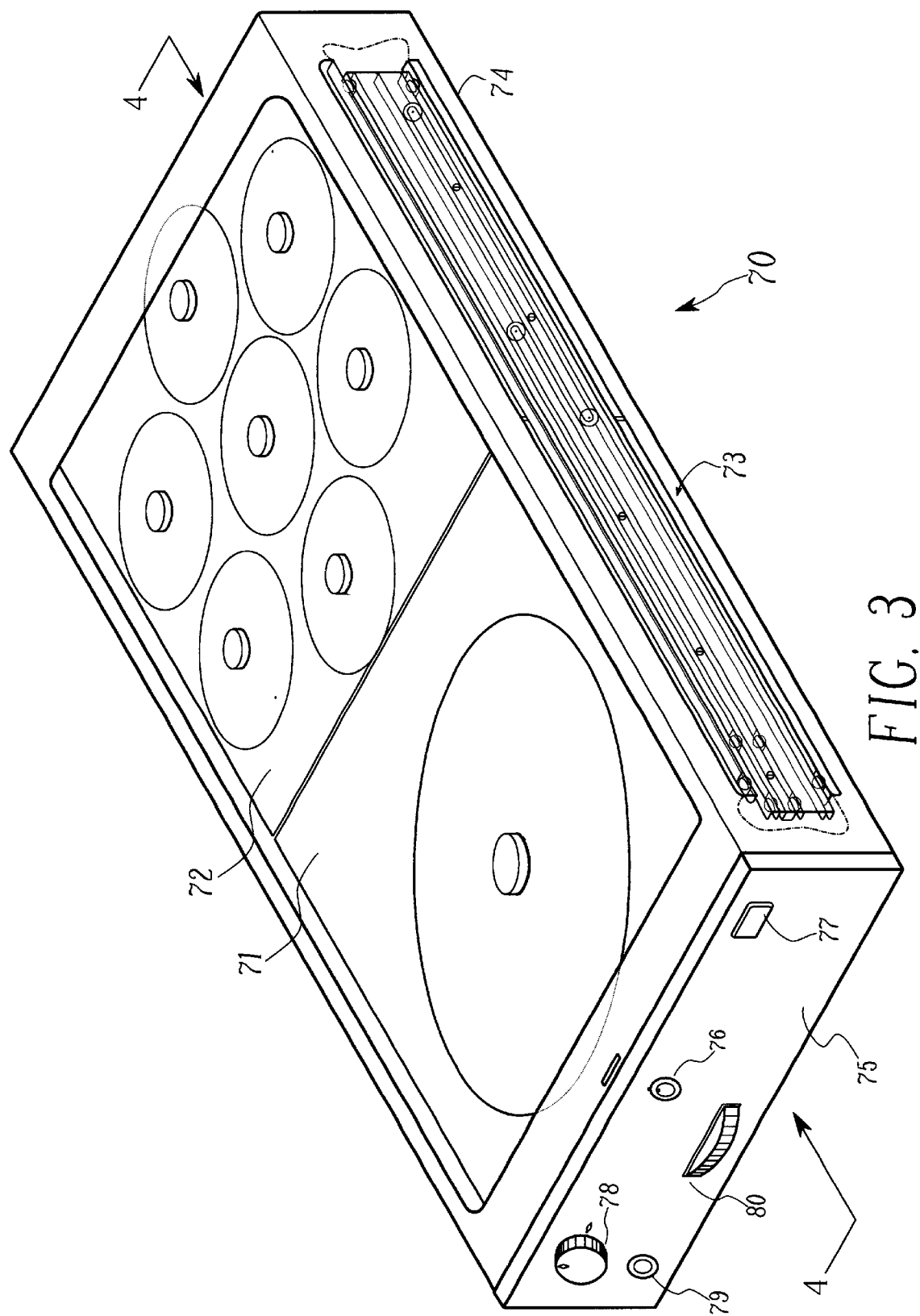
FIG. 3 is a perspective, partial-cutaway view of a multitasking information processing apparatus of the present invention showing a plurality of multisized discs set in two disc compartments and a disc-compartment transporting means for the front disc compartment to be able to be separately drawn out and into the playhousing.

FIG. 3 is a perspective, partial-cutaway view of a multitasking information processing apparatus 70 in accordance with the present invention, showing a front disc compartment 71 and a rear disc compartment 72 loaded with multisized discs, a pair of disc-compartment transporting means 73 for compartments 71 and 72 retractable into and out of a playhousing 74, and various control means on a front panel 75. Note that for simplification of illustration neither the disc-compartment transporting means on the other side of multitasking information processing apparatus 70 nor optical units are shown in FIG. 3. The pair of disc-compartment transporting means 73 not only allows both disc compartments to extend out of and retract into playhousing 74 but also enables front disc compartment 71 currently containing a single 120-mm optical disc to be independently extended to a disc loading/unloading position without disturbing the information reproduction being performed in rear disc compartment 72. As shown in FIG. 3, seven smaller optical discs with 45 mm in diameter are horizontally spaced in rear disc compartment 72. In the front panel 75 of multitasking information processing apparatus 70, there are a push-type button 77 for the open/close operation of front disc compartment 71, a turn-type button 78 for the open/close operation of both compartments 71 and 72, a microphone connector 79 for sound output to an earphone or speakers (not shown), and a volume controller 80 for adjustment of sound level. Also equipped in multitasking information processing apparatus 70 is a lockout device 76 for locking disc compartments 71 and 72 and thus for safeguarding the optical discs stored therein from being unauthorizedly removed. In addition to a mechanical key, the lockout device 76 is responsive to an electrical signal issued by a host computer, so that it allows the open/close operation of disc compartments controlled from the input of the keyboard of a host computer (not shown).

Figure 4:
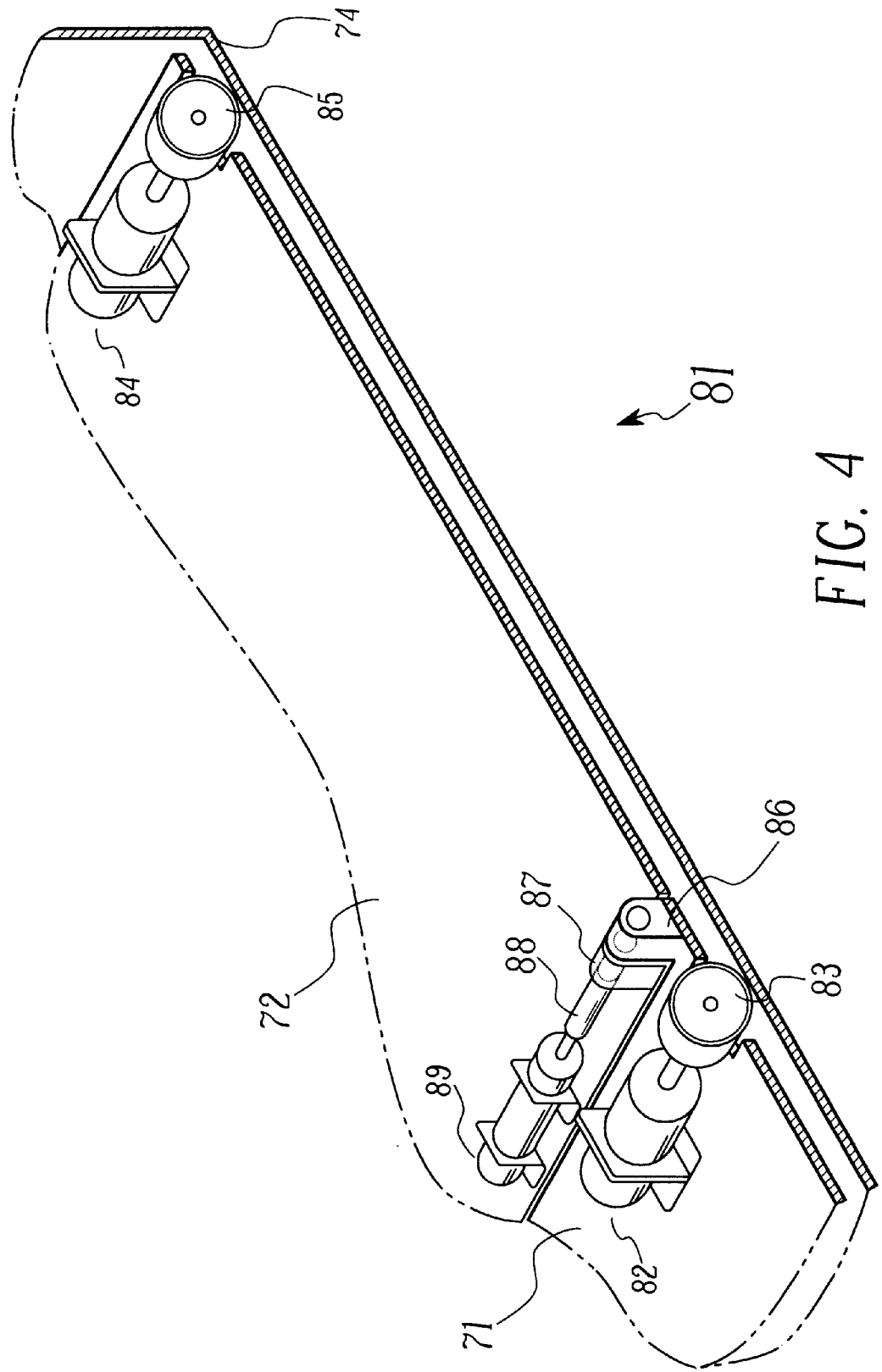
FIG. 4 is a cutaway view of the underside of the subchassis traverse driving mechanism taken along the line 4—4 in FIG. 3 of the present invention.

A partial cutaway view of the underside of a subchassis traverse driving mechanism 81 taken along the line 4—4 of FIG. 3 is shown in FIG. 4. A servo motor 82 fixed to the subchassis of front disc compartment 71 has a transverse rubber-roller 83 that tightly contacts the chassis of playhousing 74. Upon rotating, transverse rubber-roller 83 thus moves front disc compartment 71 through disc-compartment transporting means 73 to a disc loading/unloading position or a disc playing position. Rear disc compartment 72 is similarly moved by a servo motor 84 with a transverse rubber-roller 85. In order to enable both disc compartments to perform simultaneous close/open operation, the rear end of front disc compartment 71 is provided with a protruding part 86 having a center hole and the front end of rear disc compartment 72 is furnished with a protruding part 87 having also a center hole. Both center holes are aligned so as to allow the fastening/unfastening operation of latch 88 controlled by solenoid 89.

Figure 5:
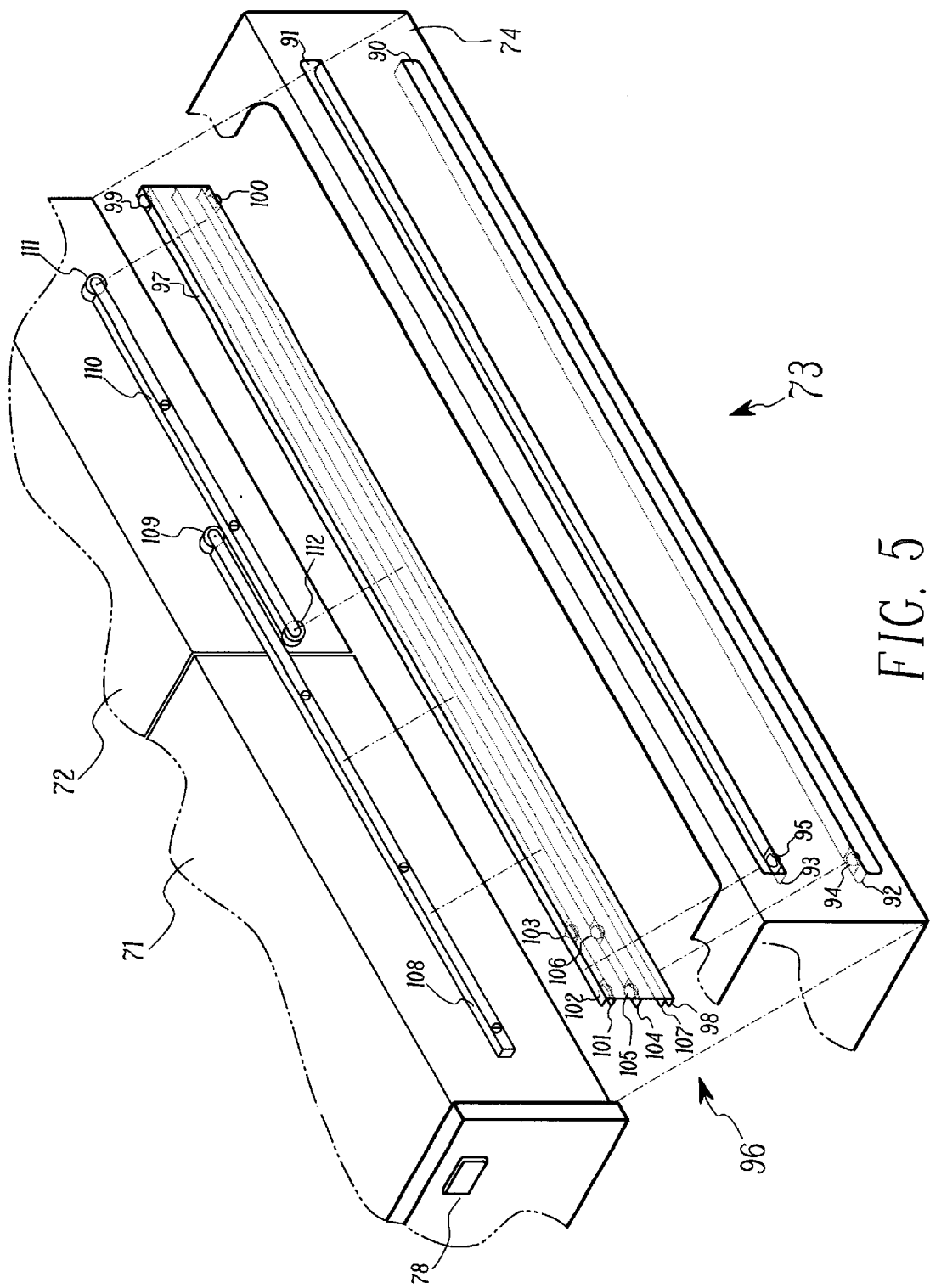
FIG. 5 is an exploded perspective view of the disc-compartment transporting means seen in FIG. 3 of the present invention.

The exploded perspective view of disc-compartment transporting means 73 of FIG. 3 is detailed in FIG. 5. Playhousing 74 is made to have narrow openings 90 and 91 that form supporting rails 92 and 93 respectively. Supporting rails 92 and 93 having bearings 94 and 95 respectively support a suspended sliding device 96 that has five guiding rails. The top and the bottom guiding rails 97 and 98 of suspended sliding device 96 have bearings 99 and 100 respectively. All together, these rails and bearings allow suspended sliding device 96 to perform sliding operation inbetween supporting rails 92 and 93. On suspended sliding device 96, guiding rail 101 has bearings 102 and 103 and guiding rail 104 has bearings 105 and 106, while guiding rail 107 has no bearing. Guiding rails 101 and 104 and their respective bearings form a gap accommodating a sliding rail 108 that is fastened only to front disc compartment 71. At the distal end of sliding rail 108, there exists a sliding roller 109 that extends to rear disc compartment 72. Thus, front disc compartment 71 can individually slide to a disc loading/unloading position. Fastened to rear disc compartment 72 is a sliding rail 110 with sliding rollers 111 and 112, which slide along the space formed by guiding rails 104 and 107. Because of the arrangement of suspended sliding device 96, rear disc compartment 72 can thus be fully opened into a disc loading/unloading position.

Figure 6:
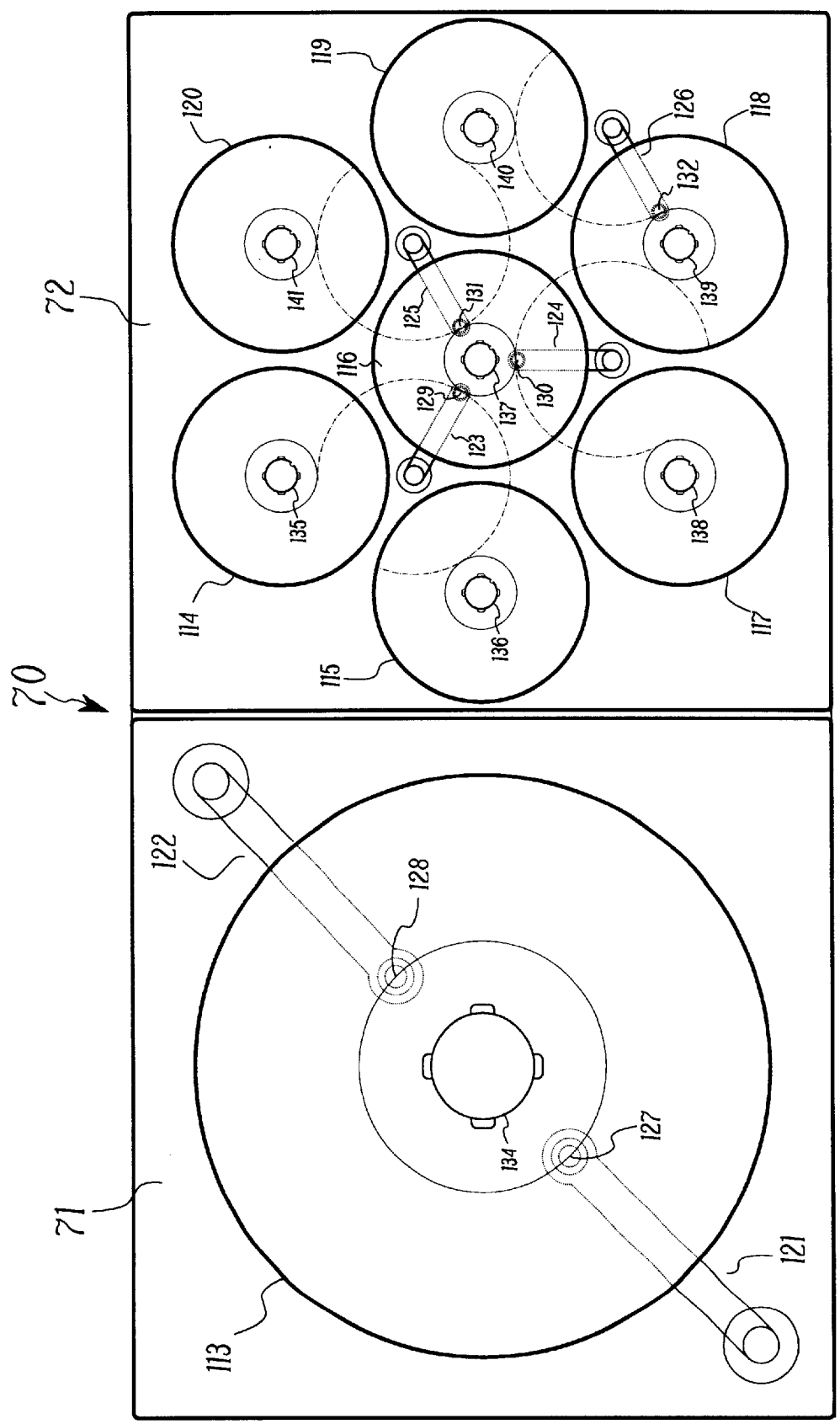
FIG. 6 is an illustrative top plan view of the multitasking information processing apparatus seen in FIG. 3 with six optical units and eight optical discs.

FIG. 6 is an illustrative top plan view of the multitasking information processing apparatus 70 seen in FIG. 3 with eight optical discs and six optical units. Situated in front disc compartment 71 are an 120-mm disc 113 horizontally disposed on turntable 134 and two optical units 121 and 122 that are able to independently and simultaneously move to any predetermined positions in radial directions with respect to disc 113 for multitaskingly reproducing information stored on the lower surface of disc 113. It is also possible that each optical unit 121 or 122 has an additional optical read head as the configuration to be shown in FIG. 15 for simultaneously reproducing information, if any, stored on the upper surface of optical disc 113.

In addition to the 120-mm disc, turntable 134 disposed within disc compartment 71 can be used to hold a disc with a smaller disc diameter. Turntable 134 is capable of rotating in a CLV or CLV scheme. For a CLV-recorded disc, only optical unit 121 is in operation; while optical unit 122 will be additionally in effect if the information of disc 113 is detected to be in a CAV-recorded scheme. Thus, either CAV-recorded or CLV-recorded discs can be scanned accordingly for information reproduction, while a CLV-recorded disc doubles its storage capacity, a CAV-recorded disc can be scanned in a high-speed, multitasking way.

Horizontally disposed in rear compartment 72 are seven 45-mm-diameter discs 114–120 respectively mounted on turntables 135–141 and four optical units 123–126 respectively comprising optical read heads 127–132. The disc-setting tables of turntables 136–141 are arranged in such a manner that discs 114–120 are horizontally aligned with each other, thus falling onto an imaginary disc plane (not shown). Optical read heads 129–132 are also aligned to the best extent, forming a horizontal travelling plane (consisting of the broken circular lines) underneath and parallel to the imaginary disc plane for facilitating their focusing during retrieving the information stored on the lower surfaces of discs 114–120.

While FIG. 6 shows a configuration in which optical read heads 127–132 are all arranged to face the lower surfaces of discs 113–120, it is possible that some of the optical units 121–126 and thus their respective optical read heads 127–132 could be arranged to face the upper surfaces of discs 113–120 so as to provide capability for retrieving information stored on the lower and the upper surfaces of these discs.

Turntable 137 and disc 116 are normally rotated in the CLV method by a turntable motor 722 that also drives the other six turntables and thus discs to rotate in the CLV method. As illustrated by the broken circular lines, each of optical units 123–126 is able to travel horizontally to an optical disc selected between discs 114–116, between discs 116–118, between discs 116, 119 and 120, and between discs 118 and 119, respectively, for information reproduction. Information stored on the 45-mm discs is preferably in the CLV scheme, in order for optical units 123–126 to perform high-speed, multitasking information reproduction. A single side of a 45-mm disc of this type is capable of holding a minimum of 60 megabytes of data, sufficient for storing a package of executable software programs such as a combination of Microsoft Word® Version 6.0a (about 17 megabytes), Microsoft Excel® Version 5.0 (about 17 megabytes), and Microsoft PowerPoint® Version 4.0 (about 18 megabytes). Use of a 45-mm disc or other small-sized discs is also more realistic than that of an 120-mm disc because software developers such as Microsoft®, WordPerfect®, or Lotus® are most likely to produce their own software discs but each of their core software programs is not big enough to even fill up 15% of an 120-mm disc capacity. This also gives a user flexibility to choose a preferred program, for instance, a word processing program between WordPerfect® Version 6.0a (about 28 megabytes) and Microsoft Word®, since both are unlikely to be stored on the same disc.

As shown in FIG. 6, disc 116 is capable of being simultaneously scanned by three optical units 123–125. This allows three executable software programs, for instance, Microsoft Word®, Excel®, and PowerPoint®, to be simultaneously executed. Disc 118 that can be scanned by optical units 124 and 126 is an ideal location for storing a Microsoft Windows® 95 disc containing a disk operating system (DOS) and other shared programs. While running executable programs from discs situated in rear disc compartment 72, a user can enjoy digital music by playing a disc situated in front disc compartment 71. The individual open/close operation capability of front disc compartment 71 through disc-compartment transporting means 73 (shown in FIG. 5) further allows a user to change a music disc, when needed, without interrupting his/her active programs that are based on the information reproduction of the discs situated in rear disc compartment 72.

Figure 7:
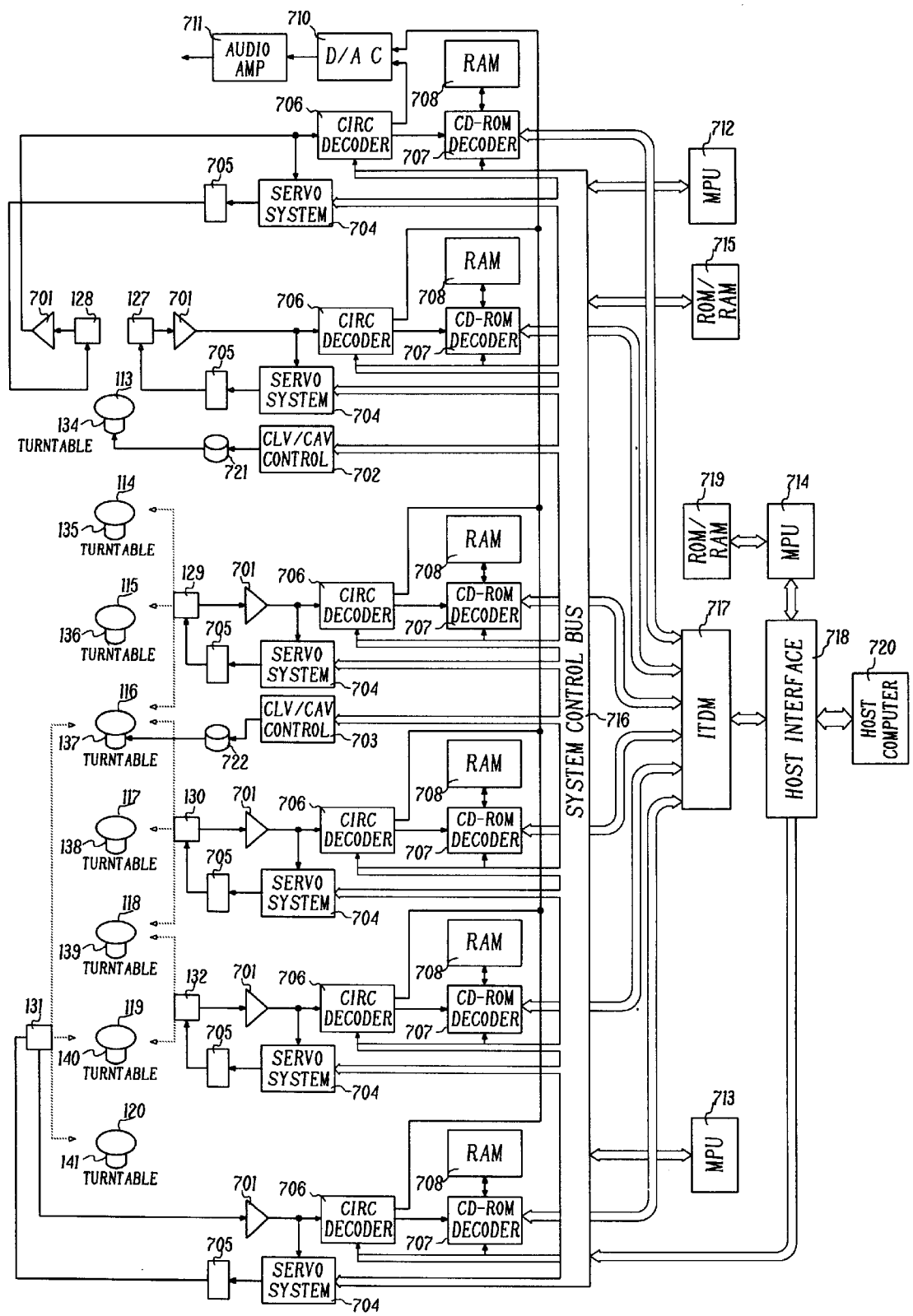
FIG. 7 is a block diagram of a control system of the multitasking information processing apparatus shown in FIG. 6 of the present invention.

FIG. 7 is a block diagram of a control system of the multitasking information processing apparatus of FIG. 6. Basically, each of optical units 121–126 seen in FIG. 6 comprises a respective one of optical read heads (i.e., pickups) 127–132 and a separate driving means 705. Each of optical units 121–126 is interfaced with a separate signal amplifier 701, a separate servo system 704, and a separate signal-processing system. Each servo system 704 comprises several servo controls that separately control a separate driving means 705 for radial tracking of a respective one of optical read heads 127–132 as well as the focusing of said respective one of optical read heads 127–132. Each signal-processing system comprises a separate CIRC (Cross Interleaved Reed-Solomon Code) decoder 706, a separate CD-ROM decoder 707, and a separate RAM (random access memory) 708. In essence, each optical read head is capable of being independently moved by a separate driving means controlled through a separate servo system to a predetermined disc position of an optical disc selected from discs 113–120 and being independently focused thereat for retrieving information stored thereon.

Signals sensed by each of optical read heads 127–132 are very weak and thus amplified by their respective signal amplifier 701 to derive usable error signals and high-frequency signals. The derived error signals interface with respective servo system 704 to control focusing and radial tracking of the respective one of optical read heads 127–132. CLV/CLV controls 702 and 703 that also receive the derived error signals through a high-speed system control bus 716 are used to respectively control the rotation speeds of turntable motors 721 and 722 at a constant linear velocity (CLV) scheme when either of optical read heads 127–132 senses CLV-recorded information from discs 113–120. The high-frequency signals derived from each of optical read heads 127–132 are in a compact disc format or specifically in the EFM (eight-to-fourteen modulation) format and thus need to be processed by a signal-process system comprising CIRC (Cross Interleaved Reed-Solomon Code) decoder 706, CD-ROM decoder 707, and RAM (random access memory) 708 in order for the signals to be deinterleaved, demodulated, and decoded for error-correction process, restoring the original sequence of data symbols, and finally converting the 14-bit word back to the original 8-bit data symbol. RAMs 708 are used in temporarily storing data for reassembling during the signal processing proceeded in the respective signal-process system. A digital-to-analog converter (D/A C) 710 and audio amplifier 711, which are only necessary when discs have audio tracks are is shared by optical units 121–126 for discs 113–120.

In order for multitasking to take place most effectively, disc 116 disposed on turntable 137 is normally rotated in the CLV method by turntable motor 722 that also provides the same rotation speed for turntables 135, 136, and 138–141. Optical read heads 129, 130, 131, and 132 are able to travel through controlled swinging by respective driving means 705 to positions proximate the lower surface of an optical disc selected between discs 114–116, between discs 116–118, between discs 116, 119 and 120, and between discs 118 and 119, respectively, for simultaneously retrieving a plurality of information sets stored thereon. This allows the total number of optical units and thus optical read heads to be less than that of turntables, thus not only reducing production costs but still providing high-efficiency and multitasking capability to the information retrieving operation performed on the same disc and/or different discs.

Also provided in FIG. 7 are (1) a plurality of control means comprising microprocessors (MPUs) 712–714, a ROM/RAM (read only memory and random access memory) 715, and (2) data transmitting means comprising a high-speed system control bus 716, ITDM (intelligent time-division multiplexer) 717, wide-band host interface bus 718, and ROM/RAM (read only memory and random access memory) 719. Each of the buses is a collection of multiple lines forming control bus, address bus, and data bus for carrying module-to-module communications. Multitasking capability of said control means and said data transmitting means is necessary in order for a plurality of sets of information to be simultaneously handled and transmitted to a host computer 720. MPUs 712 and 713 that share ROM/RAM 715 issue commands or control signals to CIRC decoders 706 and CD-ROM decoders 707 in a parallel manner through high-speed system control bus 716. The read only memory portion of ROM/RAM 715 contains basic instructions needed for MPUs 712 and 713 to issue a plurality of control signals to a plurality of servo systems 704 and a plurality of driving means 705 so as to independently and simultaneously move optical read heads 127–132 to a plurality of predetermined disc positions located either on the lower surface of one disc or on the lower surfaces of several discs for multitaskingly reproducing a plurality of information sets constituting either a program or several programs stored thereon. The random access memory portion of ROM/RAM 715 is used for temporarily storing the instructions issued from host computer 720 served as the input of MPUs 712 and 713 for controlling the travelling motions of optical read heads 127–132.

After being deinterleaved, demodulated, and decoded by CIRC decoders 706 and CD-ROM decoders 707, the plurality of information sets retrieved from optical read heads 127–132 are converted back to the original 8-bit data symbol. The plurality of converted information sets are multiplexed by ITDM 717 in order to be simultaneously transferred to host computer 720 through wide-band host interface bus 718 that is interfaced with microprocessor 714, and ROM/RAM 719. Microprocessor 714 with multitasking capability controls the simultaneous transmitting of the multiplexed information to host computer 720. The read only memory portion of ROM/RAM 719 contains basic instructions defining how MPUs 712 and 713 should work coordinately and simultaneously together to issue commands to optical units 121–126 in order for a plurality of them to efficiently, multitaskingly, and simultaneously retrieve a plurality of information sets constituting one program or several programs stored on one disc or separately on plural discs. The random access memory portion of ROM/RAM 719 is used as a buffer memory storage for temporarily storing the information to be transmitted when host computer 720 is tied up with other operations. When ready, the host computer 720 can accept the information temporarily stored in ROM/RAM 719 in bursts according to the instruction of MPU 714. While three microprocessors 712–714 are shown in FIG. 7 for controlling the reproducing and transmitting of information, it is possible that more microprocessors can be utilized or these microprocessors are replaced by a single high-performance multitasking microprocessor having a full 32-bit architecture with 32-bit address and data bus systems or better. Similarly, a less proportion of shared electronics such as digital-to-analog converter 710 and audio amplifier 711 are possible, as are other electronic configurations.

Owing to the high-speed and multitasking nature of the information processing apparatus 1 of the present invention, it becomes practical to execute programs directly from optical discs. This eliminates the conventional, tedious and time-consuming software installation procedure in which a software program stored on a plurality of floppy disks or an optical disc has to be (decompressedly) copied to a hard-disk drive of a computer from where the software program is then executed. This advantage is described in detail using the exemplary configuration of FIGS. 6 and 7 in which presumedly disc 116 contains a package of Microsoft® software programs including Microsoft Word®, Excel®, and PowerPoint® and disc 118 is a Microsoft Windows® 95 disc containing a disk operating system (DOS) program and other shared Windows files for the basic operation of host computer 720. After discs 116 and 118 are properly loaded, optical read heads 129–132 first recognize the existence of both discs and their corresponding programs in order to create a disc directory-structure file, which is similar to a file allocation table (FAT) created for monitoring the use of the sectors of a hard-disk drive, for storing the basic information of both discs such as disc locations and directory structures to the hard-disk drive of host computer 720. The disc directory-structure file is updated only if discs 116 and 118 are replaced by other others or newer discs are added to other empty turntables. There is essentially no software installation as manually needed in the conventional practice. Software programs can be written in such a way as to automatically create or modify: (1) a user definable boot file (such as autoexec.bat) on a hard-disk drive in order to quickly direct the host computer 720 to the locations of the software programs contained in discs 116 and 118, and (2) a working directory on the hard-disk drive of host computer 720 for storing resulting files that will be created or changed during the execution of the programs.

Because none of the program files on the optical disc is copied to the hard-disk drive, the approach of the present invention essentially eliminates software installation, therefore alleviating the heavy burden of a hard-disk drive in information reproduction. Note that according to the conventional practice both software programs and resulting/working files are mixedly stored on a hard-disk drive during the routine operation of a computer. Accordingly, the present invention provides two additional advantages: (1) eliminating the need to demand a high-capacity hard-disk drive for storing program files that will never be altered throughout the entire life of their usage, and (2) eliminating time-consuming hard-disk drive maintenance that involves file defragmentation in order for a hard-disk drive to regain its performance.

Further, the capability of launching a program directly from an optical disc loaded in the information processing apparatus 1 of the present invention eliminates the need for an end user to make a set of backup copies (on floppy disks) for a purchased software program and thus a software developer can make its CD-version products not executable from a hard-disk drive, accordingly minimizing illegal-copying of a software program. This can be simply based on, for instance, the difference in recording formats between the optical disc and the hard-disk drive. A software developer can embed a key code in the EFM format onto an optical disc containing the program to be copy-right protected. Without detecting the presence of the embedded key code in the EFM format, a computer will not execute the program. This in effect disables the program to be executed from a hard-disk drive, and thus completely prevents spreading of a software program. This type of software program can be considered to be a hardware type in nature, because its copy-right protection is not relied on the conventional practice of using a sealed envelope. As software manufacturers are well protected, consumers can be afforded their opportunity to really try out a fully-working version of a software program before deciding whether to keep it or not.

During the process of booting, host computer 720 in accordance with the booting instruction of a user defined boot file (e.g., autoexec.bat) created on the hard-disk drive interfaces through wide-band host interface bus 718 with MPU 714 that determines and issues the most efficient instructions to MPUs 712 and 713 in order for them to provide power signals to respective servo systems 704 and respective driving means 705 so as to move optical read heads 130 and 132 to disc 118 for simultaneously reproducing the disk operating system (DOS) information and Microsoft Window® 95 information. It is preferred that ROM/RAM 715 stores a set of predefined instructions; and, software programs stored on the disc are written and arranged in a particular manner so that optical read head 130 is controlled to move specifically to a predetermined position selected from a set of disc tracks that contain sound information and/or other non-video files while optical read head 132 is instructed to move specifically to another predetermined position selected from another set of disc tracks that contain video information and/or other non-sound files. In other words, optical read head 130 is controlled for producing sound effects and other non-video files while optical read head 132 is instructed mainly to produce video images and other non-sound files. Controlled by data transmitting signals issued by microprocessor 714, video images can be transmitted in bursts through wide-band host interface bus 718 directly to a video circuit (not shown) of host computer 720. With this scheme, reproduction of video images and sound effects can be simultaneous, thus allowing a program to be executed at a much higher speed and arriving at a ready-to-run state in no time.

In contrast, in accordance with the conventional practice, the proceeding of a Windows-based software program is inevitably interrupted constantly, especially when video information and sound information are too large to be read within a reasonable time period.

Disc 116 loaded on turntable 137 can be simultaneously accessed by three optical read heads 129–131. Accordingly, an information processing apparatus of this type will hardwarely allow a user to simultaneously execute three different programs at the same time. Front disc compartment 71 seen in FIG. 6 has its own turntable 134, optical units 121 and 122, CLV/CLV control 702 and turntable motor 721 (both shown in FIG. 7) for rotating and scanning an 120-mm CD at either the CLV or the CLV method; thus, an audio CD can be simultaneously played while a user is executing the software programs stored on the discs disposed in rear disc compartment 72.

Figure 8:
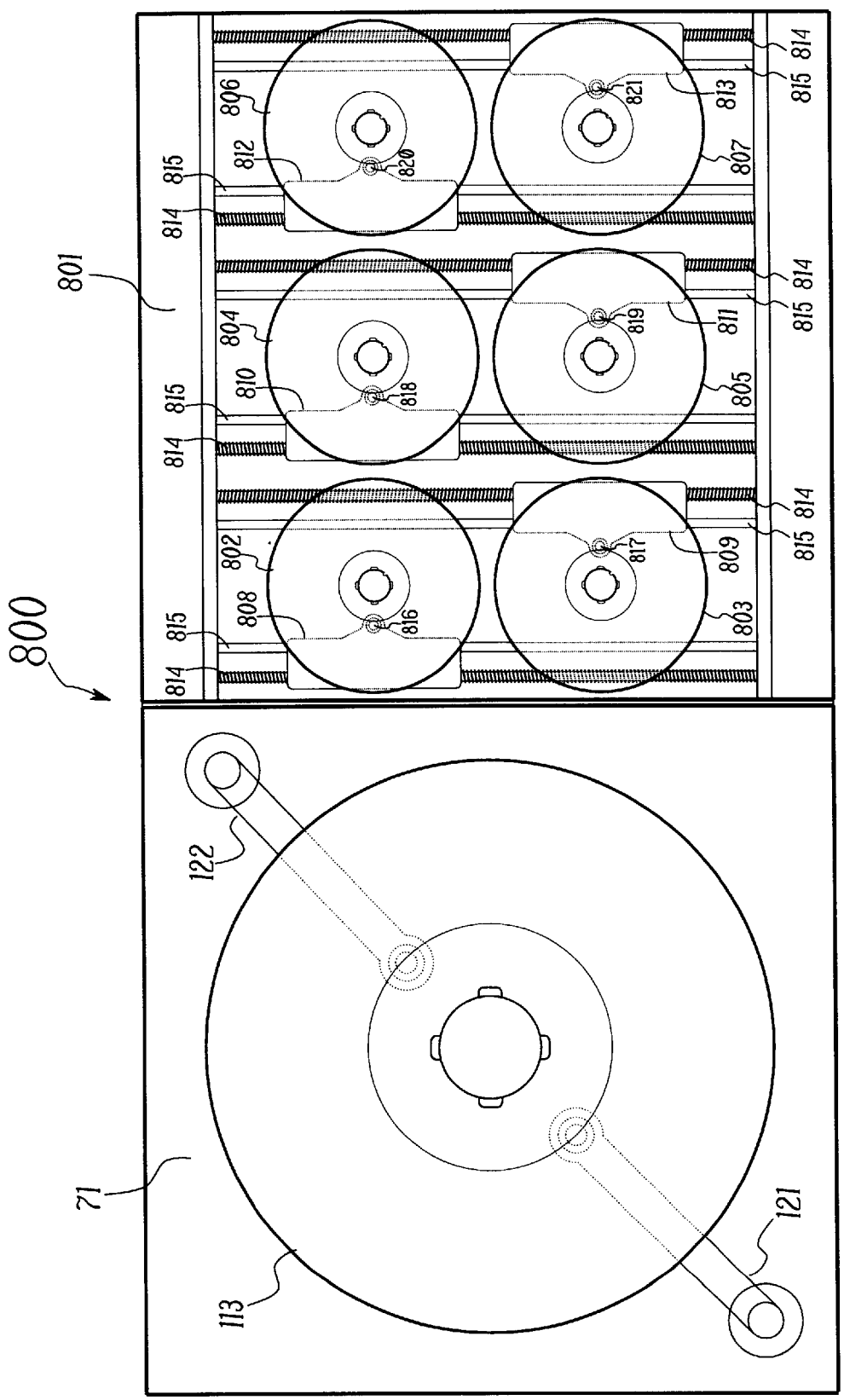
FIG. 8 is an alternative configuration of turntables and optical units.

Shown in FIG. 8 is an information processing apparatus 800 with an alternative configuration of disc-storage locations and optical units, having a rear disc compartment 801 different from FIG. 6. The rear disc compartment 801 of FIG. 8 bears six discs 802–807 and six optical units 808–813. In accordance with this embodiment, at least, discs 802 and 803, discs 804 and 805, and discs 806 and 807 are respectively aligned with each other. Further, each of optical units 808–813 is capable of linearly moving along a screw shaft 814 and a sliding rail 815 by a predetermined distance in a radial direction of a selected disc so as to allow each of respective optical read heads 816–821 to be correspondingly positioned on a predetermined disc position for retrieving information stored thereon. Thus, each of discs 802–807 can be scanned either by one optical read head or by two optical read heads simultaneously for information reproduction.

Figure 9A:
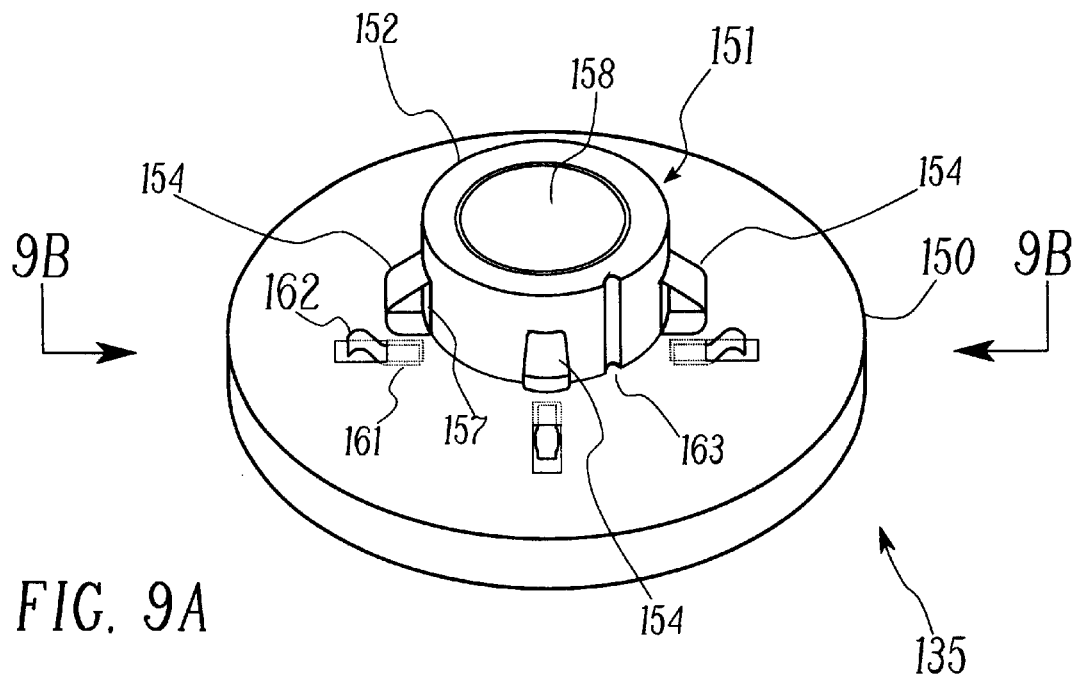
FIGS. 9A and 9B are perspective and cutaway side views, respectively, for the turntable having a disc-holding and -releasing means with a self-clamping and self-releasing feature in accordance with the present invention.
Figure 9B:
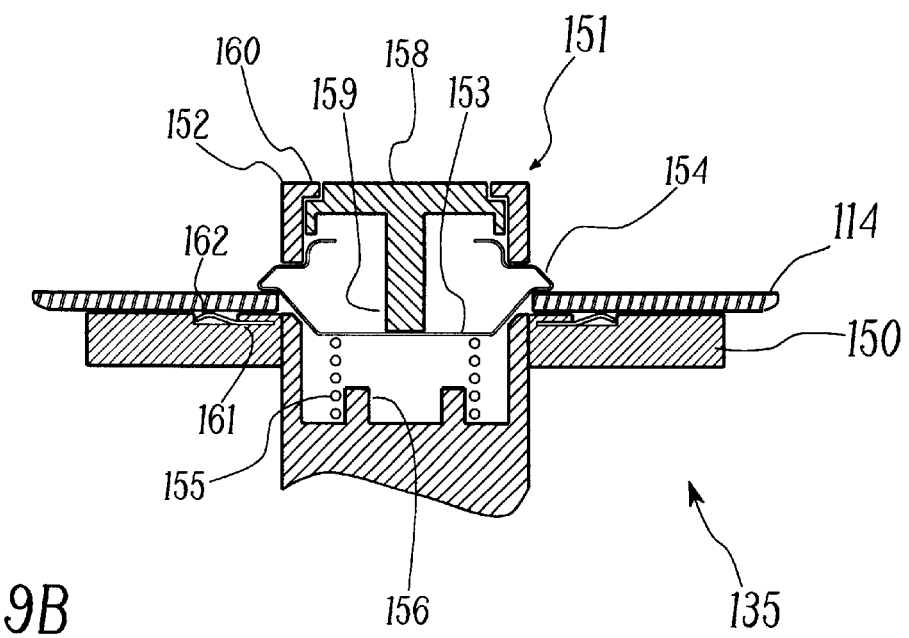

FIGS. 9A and 9B are perspective top and cutaway side (along the line 9B—9B) views respectively of the turntable showing a disc-setting table and a disc-holding and -releasing means having a self-clamping and -releasing mechanism for detachably holding an optical disc thereon in accordance with the present invention. The disc-holding and -releasing means and thus the self-clamping and -releasing mechanism of the turntable herein are characterized by miniaturization and are designed to facilitate disc loading/unloading operation. In the following, exemplary illustration is given to turntable 135 and disc 114 disposed thereon as seen in FIG. 6. To facilitate illustration, only FIG. 9B is loaded with disc 114. Turntable 135 basically comprises a disc-setting table 150 for horizontally bearing a disc thereon and an elevated center portion 151 which is sized to fit into the center hole of optical disc 114 as shown in FIG. 9B. Elevated center portion 151 comprises a hollow member 152 being in a cylindrical shape wherein a spring device having a flat bottom 153 and four strip ends 154 is situated on the top of spring 155 that provides up-and-down motion through a guiding ring 156. During disc loading, spring strip ends 154 are forced to retract through four openings 157 to the inside of hollow member 152 and then return to their outward-biased normal position that also provides a slightly downward force so as to hold disc 114 in place as shown in FIG. 9B. Also in the elevated center portion 151 is a release mechanism having a pressing button portion 158 and a release bottom portion 159. Pressing button portion 158 is confined in the inside of hollow member 152 by means of the circular edge 160 of hollow member 152. When pressing button portion 158 is pushed by a user's finger for disc unloading, release bottom portion 159 and thus flat bottom 153 are accordingly moved downward to cause the retraction of spring strip ends 154 into the inside of hollow member 152, thus releasing disc 114. To obtain self-releasing function, disc-setting table 150 is made to comprise disc-releasing springs having one end held by the rectangular slots 161 and the other end 162 biased upward but capable of being pushed downward when disc 114 is held in place by spring strip ends 154.

Hollow member 152 may optionally have a noncircular outer boundary such as having a locking portion 163 for adapting an optical disc having a center hole with a complementary boundary or shape so as to ensure precision griping, thus allowing disc 114 to rotate at a speed much higher than the conventional practice.

Figure 10:
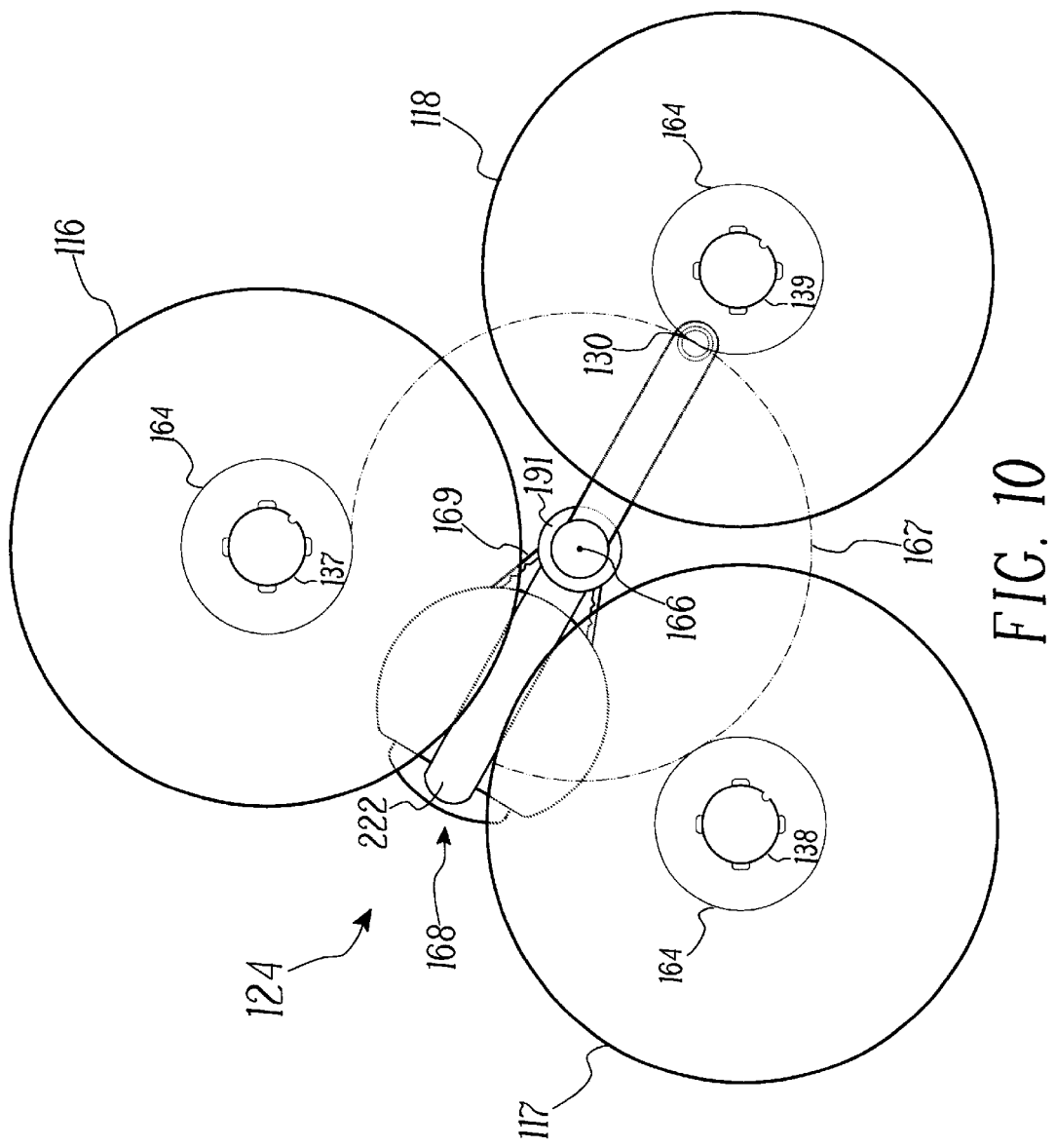
FIG. 10 is a perspective top view of an optical unit as used in FIG. 6 that is able to access any position among three discs by horizontally swinging in accordance with the present invention.

FIG. 10 is an enlarged perspective top view of optical unit 124 and three adjacent discs 116–118 which are arranged in the same configuration as seen in FIG. 6, illustrating that a single driving means (or swing mechanism) is used to horizontally move an optical read head selectively between disc positions as well as between a plurality of discs for information reproduction in accordance with the present invention. Information starting from disc directory structures is stored from each innermost track 164 to the outermost edge of discs 116–118. Located at the distal end of optical unit 124 is an optical read head 130 that is currently positioned at the innermost track 164 of disc 118. Optical read head 130 is able to swing about axis 166 that is rotatably supported by bearing 191 and supporting frame 222 attached to driving means 168, in accordance with a broken circular line or travelling path 167. The swing motion of optical read head 130 is powered by the driving means (or swing mechanism) 168 through a toothed belt 169. Discs 116–118 are horizontally aligned with each other so as to facilitate the focusing action of optical read head 130 to each of the discs, and are concentric with respect to axis 166 so that the innermost tracks of the three discs are reachable as indicated by the broken circular line 167. Thus, by spinning these discs and by swinging optical read head 130 about axis 166, information stored on any tracks of discs 116–118 becomes readily reproducible.

Figure 11:
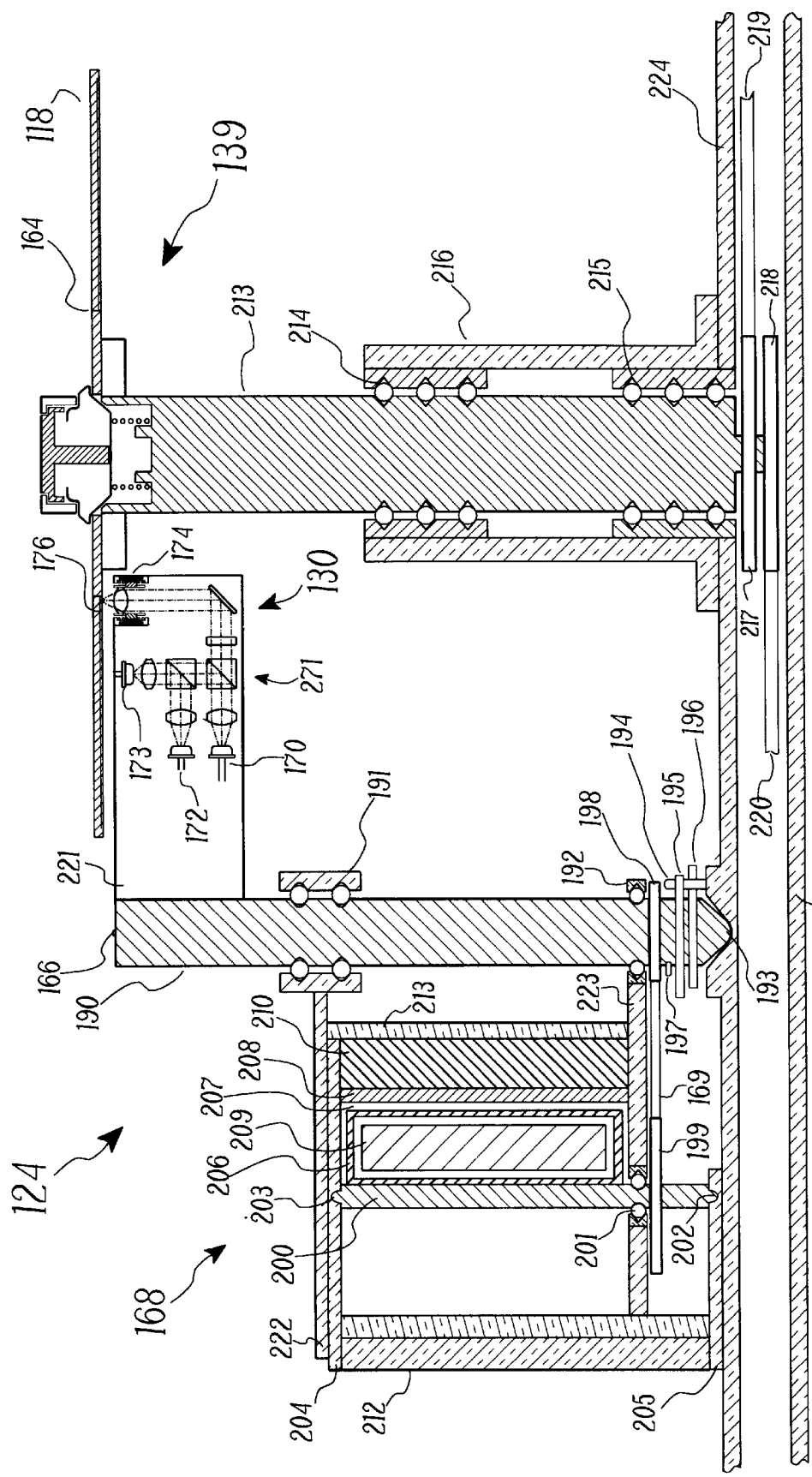
FIG. 11 is a cutaway view of an optical unit with an optical read head and a driving mechanism, and a turntable with a disc-holding and -releasing means in accordance with the present invention.

FIG. 11 is a cutaway view, showing turntable 139 on which disc 118 is horizontally disposed and optical unit 124 that comprises optical read head 130 and driving means (or swing mechanism) 168 for providing a necessary force to horizontally swing optical read head 130 to a preselected position. Turntable 139 has a turntable shaft 213 which is rotatably supported by bearings 214 and 215 that are attached to a supporting frame 216 fastened to the bottom frame 224 of compartment 72. At the bottom portion of turntable shaft 213 are pulleys 217 and 218 that are connected respectively by toothed belts 219 and 220 for transmitting rotation power from turntable motor 722 seen in FIG. 7 and to other turntables. Under these circumstances, a plurality of turntables can be driven by a single turntable motor. This greatly reduces construction costs and space for commercializing the optical information processing apparatus of the present invention.

Optical read head 130 situated in an optical-read-head housing 221 comprises a semiconductor laser diode 170, a lens system 171, photosensors 172 and 173, and a focusing mechanism 174 situated on the distal end of optical-read-head housing 221. As detailed in FIG. 12, semiconductor laser diode 170 is a light source for producing a laser beam. The laser beam emitted from laser diode 170 is converted by a collimator 175 to a parallel light beam 176 that is bent at an angle of 90° by means of a mirror 177 and is then focused by a focusing mechanism 174 onto the information-stored surface layer 178 of disc 118. A beam of light reflected from the information-stored surface layer 178 is deflected at an angle 90° by mirror 177 and is then condensed through a quarter-wavelength ($\lambda/4$) plate 179, polarizing beam-splitting prisms 180 and 181, the lens 182 to a photosensor 172 that reads the change of the output signals.

Figure 12:
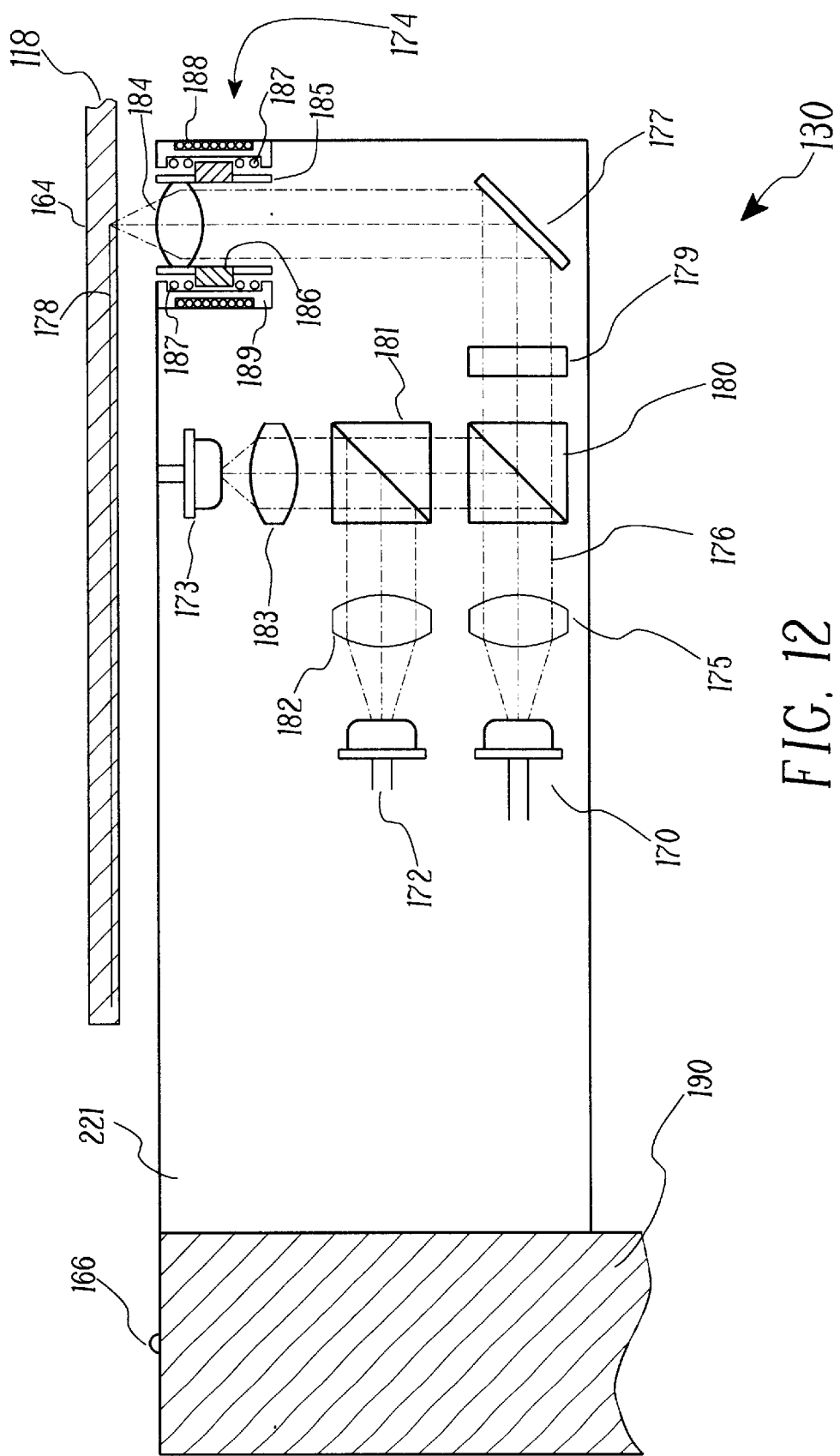
FIG. 12 is an illustrative, cutaway side view of an optical read in accordance with the present invention.

Focusing mechanism 174 detailed in FIG. 12 comprises an objective lens 184 attached to vertically movable device 185, tension springs 187, and a focus-tracking coil 188 wound around a stationary bobbin 189. Vertically movable device 185 has a ring-type magnet 186 fixedly situated therein. Tension springs 187 provide tension and keep objective lens 184 straight in the focusing mechanism 174 as objective lens 184 vertically moves. Projection lens 183 and photosensor 171 are arranged in a direction of the beam that is reflected from disc 118, bent by mirror 177, and condensed through $\lambda/4$ wave plate 179, polarizing beam-splitting prisms 180 and 181, thereby detecting a focusing error. In the focused condition, a zero error exists from photosensor 171. When an error signal produced from either a too-far or a too-close condition is detected by photosensor 171, the detected error signal is amplified and fed to focus-tracking coil 188 wound around stationary bobbin 189 which then produces a magnetic field to cause ring-type magnet 186 and thus objective lens 184 to move in the relevant direction until the error signal becomes zero and the beam is in focus.

As shown in FIG. 11, the other distal end of optical-read-head housing 221 is attached to a shaft 190 that is rotatably supported by bearings 191 and 192 and has a pivoted end 193 for its swinging. Bearings 191 and 192 are respectively supported by top and bottom supporting frames 222 and 223 fixedly attached to driving means 168. A stop pin 194 fixedly attached to the bottom frame 224 of rear disc compartment 72 and two helical tension springs 195 and 196 arranged in opposite direction are provided in order to produce torque restrain for a steady swing of shaft 190 about its axis 166. A stop pin 197 fixedly attached to the bottom portion of shaft 190 is provided for shaft 190 to rest at a reference position. Toothed belt 169 connects a pulley 198 on shaft 190 and a pulley 199 on moving-coil shaft 200 for transmitting rotation power. Pulley 199 has a diameter larger than pulley 198 so that driving means 168 can provide a maximal swing angle of 300 degrees. Supported by bearings 201, moving-coil shaft 200 has top and bottom pivots 202 and 203 that are respectively held in place by top and bottom frames 204 and 205 for its swing.

Figure 13:
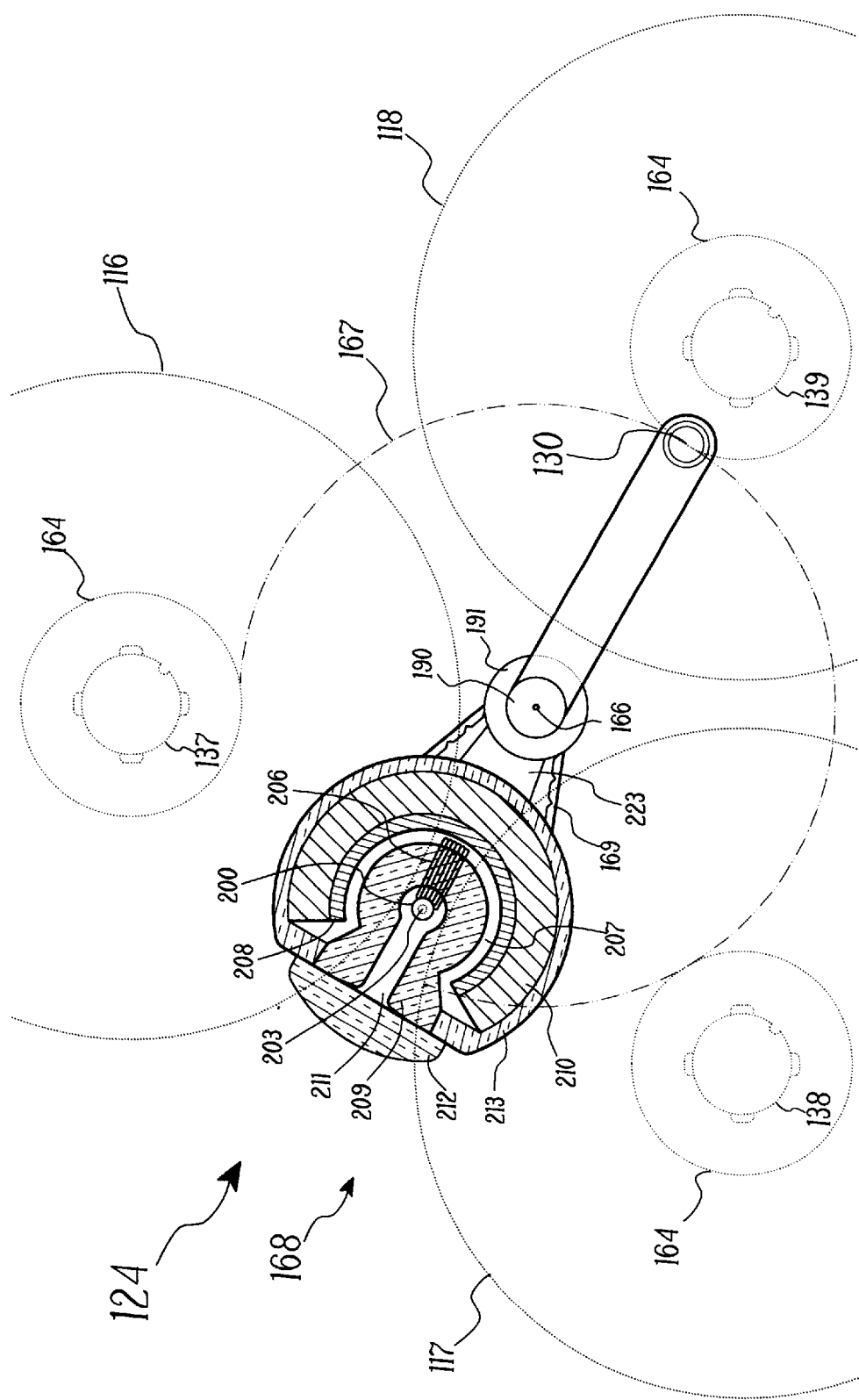
FIG. 13 is an illustrative top view of an optical unit of the present invention comprising a driving means in a cutaway top view that enables an optical read head not only to take a predetermined position on a disc but also to travel between three discs.

Driving means (or swing mechanism) 168 as seen in FIG. 11 is further detailed in FIG. 13 in a partial cutaway top view in which top frame 204 and supporting frame 222 (seen in FIG. 11) are removed. In accordance with the present invention, driving means 168 is able to provide a rotating force to horizontally swing optical read head 130 about axis 166 for a maximal swing angle of 300° as indicated by the broken circular line or travelling path 167. This allows optical read head 130 to travel between positions of a selected disc as well as between discs 116–118. Most importantly, the travelling of optical read head 130 between these discs is as rapid as that between positions of a selected disc, because the travelling involves neither multidirectional nor three-dimension maneuver but needs only one single-directional movement.

In order to provide a rotating force, driving means 168 is arranged as shown in FIGS. 11 and 13, in which one end of a moving coil 206 is fixedly attached to moving-coil shaft 200, the other end is allowed to freely travel in a uniform air gap 207 defined by an outer soft-iron pole piece 208 and inner pole piece 209. Bonded to outer soft-iron pole piece 208 is a magnet 210. An air gap 211 extending to the inner area of covering frame 212 is provided in order for moving-coil shaft 200 with attached moving coil 206 to be assembled into the configuration of FIG. 13 and also allows moving-coil shaft 200 and the fixedly attached end of moving coil 206 to rotate about the axis defined by pivots 202 and 203 (FIG. 11). Attached to the outer circular area of magnet 210 is a laminated steel shell 213 that acts as a magnetic collector ring and also effectively shields the element from stray fields.

Figure 14:
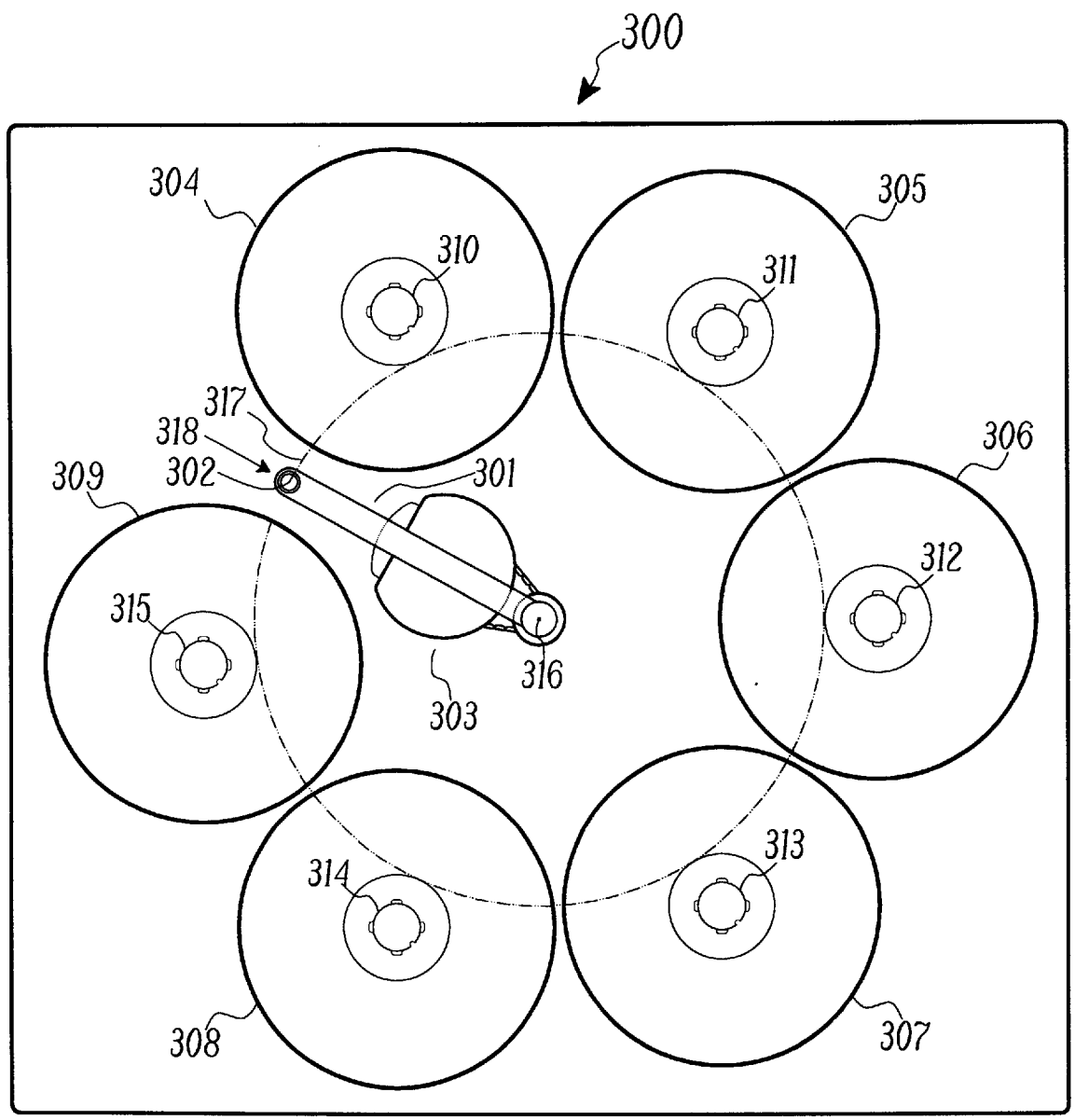
FIG. 14 is an illustrative top view of a single optical unit in accordance with the present invention, having a driving means for allowing at least one optical read head situated therein to travel to at least one predetermined position selectively between a plurality of discs for retrieving information stored thereon.

Illustrated in FIG. 14 is another preferred embodiment of the present invention, wherein information processing compartment 300 has an optical unit 301 comprising an optical read head 302 and a driving means (or swing mechanism) 303, wherein said driving means 303 enables said optical read head 302 to travel by swinging about axis 316 to any positions on discs 304–309 respectively mounted disposed on turntables 310–315 for information reproduction. Each of these discs has a diameter of 45 mm. Within the compartment, these discs are horizontally and concentrically disposed at predetermined positions such that the disc centers are at an equal distance from the axis 316 of optical unit 301. Underneath turntable 310 is a turntable motor (not shown) which is also used to drive turntables 231–315 simultaneously. Each of turntables 310–315 comprises its own disc-loading and releasing means with self-clamping and -releasing feature so that once being loaded onto turntables 310–315, discs 304–309 will remain being clamped at any time and can be rotated simultaneously. Thus, without going through other intermediate loading stages (such as internal disc changing or selecting used in the prior art), information reproduction can be effectively performed by simply moving optical read head 302 to a disc selected between discs 304–309 disposed within the same compartment. This eliminates any need to equip an information processing apparatus with a disc-turntable rotating mechanism, a disc transporting means, or other disc changers described in prior arts such as U.S. Pat. Nos. 5,119,354, 5,146,451, 5,193,079, and 5,334,218.

Driving means 303 enables optical unit 301 to perform a maximum of 350° swing about axis 316, starting from position 318, for accessing selectively between disc tracks and discs 304–309. In essence, optical read head 302 of optical unit 301 travels in accordance with the broken circular line 317; thus, any information stored on these discs becomes readily accessible. Because of being designed for discs with smaller sizes and being equipped with a single turntable motor and a shared optical unit 301, compartment 300 can be economically produced in a size similar to the commercially available single 120-mm-disc player, for being installed into the interior of a personal computer.

Apparatus 300 is optionally equipped with a servo control (not shown), which enables the turntable motor to rotate at a constant linear velocity (CLV) in addition to at a constant angular velocity (CLV). Use of the CLV-recording method doubles the storage capacity of the 45-mm disc to 120 megabytes from 60 megabytes compared with use of the CAV-recording method. This is advantageous for a software developer to fit a lengthy program or several programs as a package into a single small-sized disc. On the other hand, if information to be stored in a 45-mm disc is less than 60 megabytes, the CAV method is preferred in order to allow information reproduction to be performed at a higher speed.

Figure 15:
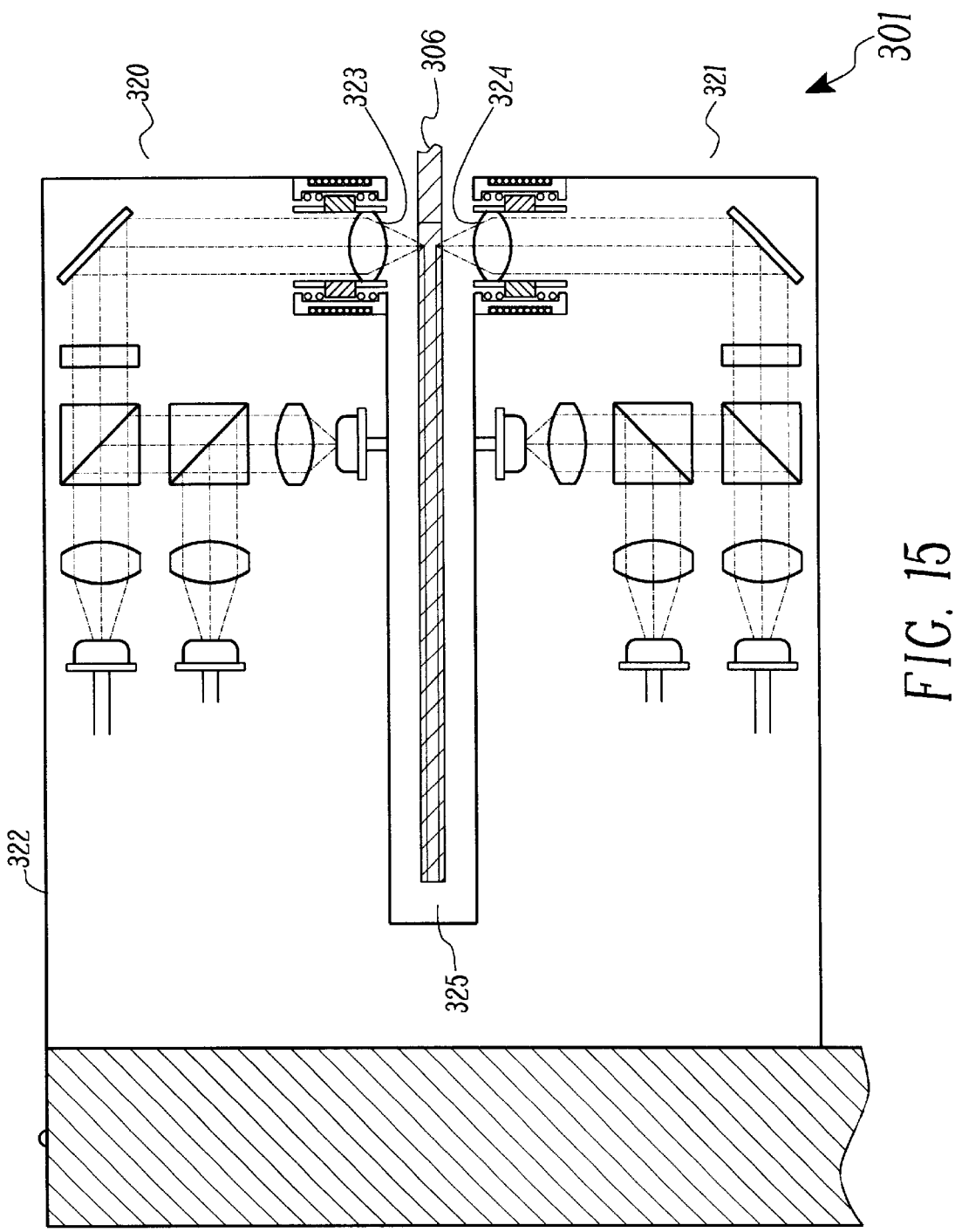
FIG. 15 is a cutaway view of an optical unit comprising an upper optical read head and a lower optical read head for simultaneously reproducing information stored on both surfaces of a disc.

In a further preferred embodiment of the present invention, discs 304–309 shown in FIG. 14 are arranged in a manner so that there is an open space between disc 304 and disc 309 for optical unit 301 to park at position 318. This open space allows optical unit 301 of apparatus 300 to further comprise an upper optical read head 320 in addition to lower optical read head 321 as shown in FIG. 15, without causing any inconvenience to disc loading/unloading operation. Upper and lower optical read heads 320 and 321 have configurations similar to the embodiments of optical read head 130 singularly situated in optical-read-head housing 221 hereinbefore detailed in FIG. 12. Optical-read-head housing 322 has a horizontal open slot 325 for an optical disc selected from discs 304–309 to insert therein so that the innermost positions on both surfaces of the disc become simultaneously accessible to an objective lens 323 of upper optical read head 320 and an objective lens 324 of lower optical read head 321. Note that objective lens 323 is disposed in a direction facing to objective lens 324, so as to face the other surface (i.e., the upper surface) of an optical disc selected from disc 304–309. The use of two optical read heads in an optical unit provides twofold advantages: doubling not only the information storage capacity of a disc but also the speed of information reproducing.

While preferred embodiments of the present invention have been shown and described herein, it will be understood that such embodiments are provided by way of example only. Numerous variations, changes, modification, and substitutions will occur to those skilled in the art without departing from the invention herein. Accordingly, it is intended that the invention be limited only by the spirit and scope of the appended claims.

What is claimed is:

1. A method for providing multitasking information processing, comprising the steps of:

(a) providing a plurality of turntables each for detachably storing an optical disc thereon;

(b) affording a plurality of optical units each comprising a driving means and an optical read head, wherein said driving means is provided for moving said optical read head in a radial direction of said optical disc to a predetermined disc position on one surface of a selected optical disc;

(c) simultaneously controlling a plurality of said driving means so as to move a plurality of said optical read heads in radial directions of said optical disc to a plurality of predetermined disc positions for simultaneously retrieving said information stored thereon;

(d) enabling signal-process means capable of multitaskingly processing a plurality of information sets retrieved by said plurality of optical read heads; and (e) rendering data transmitting means capable of transmitting a plurality of said information sets processed by said signal-process means.

2. The method for providing multitasking information processing of claim 1, wherein said simultaneously controlling is adapted to comprise (i) random access memory, (ii) instructions stored in said random access memory, and (iii) microprocessor means for executing said instructions and for issuing control signals accordingly to coordinately control the plurality of said optical units in performing information retrieving multitaskingly or simultaneously.

3. The method for providing multitasking information processing of claim 1, wherein said enabling is further adapted for enabling said signal-process means to comprise video circuitry for processing video information retrieved selectively from a digital video disc or a multimedia disc into video images.

4. The method for providing multitasking information processing of claim 1, wherein said enabling is adapted for enabling said signal-process means to further comprise at least one digital-to-analog converter and at least one audio amplifier for processing audio information retrieved selectively from a digital audio disc, an audio compact disc, a digital video disc or a multimedia disc to produce sound effects.

5. The method for providing multitasking information processing of claim 1, wherein said enabling is further adapted for enabling said signal-process means capable of multitaskingly processing said plurality of information sets retrieved from optical discs selected from the group consisting of a software-program optical disc, a digital audio optical disc, an audio compact disc, a digital video disc, a multimedia disc, and their combinations.

6. The method for providing multitasking information processing of claim 1, wherein said enabling is further adapted for said signal-process means to comprise a decoder and random access memory.

7. The method for providing multitasking information processing of claim 6, wherein said enabling is further adapted for enabling (i) said decoder for multitasking decoding a set of digital signals retrieved by a respective one of said optical read heads into the original state of a respective information set and (ii) said random access memory as temporary storage during decoding and resembling said digital signals into said respective original state.

8. The method for providing multitasking information processing of claim 1, wherein said rendering is further adapted for rendering said transmitting means to comprise random access memory used as buffer memory storage so as to transmit said information sets in multitasking.

9. A method for providing multitasking information processing, comprising the steps of:
   (a) providing a plurality of turntables each for detachably storing an optical disc thereon;
   (b) affording a plurality of optical units each comprising a driving means and an optical read head, wherein said driving means is provided for moving said optical read head in a radial direction of said optical disc to a predetermined disc position on one surface of a selected optical disc;
   (c) simultaneously controlling a plurality of said driving means so as to move a plurality of said optical read heads in radial directions of said optical disc to a plurality of predetermined disc positions for simultaneously retrieving said information stored thereon;
   (d) enabling signal-process means capable of simultaneously processing a plurality of information sets retrieved by said plurality of optical read heads; and
   (e) rendering data transmitting means capable of transmitting a plurality of said information sets processed by said signal-process means.

10. The method for providing multitasking information processing of claim 9, wherein said simultaneously controlling is adapted to comprise (i) random access memory, (ii) instructions stored in said random access memory, and (iii) microprocessor means for executing said instructions and for issuing control signals accordingly to coordinately control the plurality of said optical units in performing information retrieving simultaneously.

11. The method for providing multitasking information processing of claim 9, wherein said enabling is further adapted for enabling said signal-process means to comprise video circuitry for processing video information retrieved selectively from a digital video disc or a multimedia disc into video images.

12. The method for providing multitasking information processing of claim 9, wherein said enabling is adapted for enabling said signal-process means to further comprise at least one digital-to-analog converter and at least one audio amplifier for processing audio information retrieved selectively from a digital audio disc, an audio compact disc, a digital video disc or a multimedia disc to produce sound effects.

13. The method for providing multitasking information processing of claim 9, wherein said enabling is further adapted for enabling said signal-process means capable of multitaskingly or simultaneously processing said plurality of information sets retrieved from optical discs selected from the group consisting of a software-program optical disc, a digital audio optical disc, an audio compact disc, a digital video disc, a multimedia disc, and their combinations.

14. The method for providing multitasking information processing of claim 9, wherein said enabling is further adapted for said signal-process means to comprise a plurality of signal-process systems each comprising a decoder and random access memory.

15. The method for providing multitasking information processing of claim 14, wherein said enabling is further adapted for enabling (i) said decoders each for decoding a set of digital signals retrieved by a respective one of said optical read heads into the original state of a respective information set and (ii) said random access memory each as temporary storage during decoding and resembling said digital signals into said respective original state, so as to simultaneously process the plurality of said information sets.

16. The method for providing multitasking information processing of claim 9, wherein said rendering is further adapted for rendering said transmitting means to comprise random access memory used as buffer memory storage so as to transmit said information sets in multitasking.

* * * * *